(12) United States Patent
Mandal

(10) Patent No.: US 10,789,369 B2
(45) Date of Patent: Sep. 29, 2020

(54) OBLIVIOUS ARRAY SHUFFLING IN TRUSTED EXECUTION ENVIRONMENTS

(71) Applicant: FUJITSU LIMITED, Kawasaki-shi, Kanagawa (JP)

(72) Inventor: Avradip Mandal, Sunnyvale, CA (US)

(73) Assignee: FUJITSU LIMITED, Kawasaki (JP)

( * ) Notice: Subject to any disclaimer, the term of this patent is extended or adjusted under 35 U.S.C. 154(b) by 261 days.

(21) Appl. No.: 16/006,665

(22) Filed: Jun. 12, 2018

(65) Prior Publication Data
US 2019/0377884 A1 Dec. 12, 2019

(51) Int. Cl.
G06F 21/60 (2013.01)
H04L 9/06 (2006.01)
G09C 1/00 (2006.01)

(52) U.S. Cl.
CPC .............. *G06F 21/60* (2013.01); *G09C 1/00* (2013.01); *H04L 9/0643* (2013.01)

(58) Field of Classification Search
CPC .......... G06F 21/60; G06F 21/62; G06F 12/14; G06F 12/1408
See application file for complete search history.

(56) References Cited

U.S. PATENT DOCUMENTS

| 6,145,064 | A * | 11/2000 | Long | G06F 12/1018 711/158 |
|---|---|---|---|---|
| 2004/0083347 | A1* | 4/2004 | Parson | G06F 16/9014 711/165 |
| 2008/0256346 | A1* | 10/2008 | Lee | G06F 9/322 712/239 |
| 2011/0246787 | A1* | 10/2011 | Farrugia | G06F 21/14 713/189 |
| 2013/0173917 | A1* | 7/2013 | Clifton | G06F 16/334 713/167 |
| 2013/0262880 | A1* | 10/2013 | Pong | G06F 21/79 713/193 |
| 2015/0220457 | A1* | 8/2015 | Katoh | G06F 21/31 713/193 |

(Continued)

OTHER PUBLICATIONS

Keller et al., Efficient, Oblivious Data Structures for MPC, 2014, ASIACRYPT 2014: Advances in Cryptology—ASIACRYPT 2014 pp. 506-525 (Year: 2014).*

(Continued)

*Primary Examiner* — Khang Do
(74) *Attorney, Agent, or Firm* — Maschoff Brennan

(57) ABSTRACT

A method of approximate address shuffling of an array includes receiving an array having an array size and non-null elements located in initial locations. The method includes receiving a pseudo-random function (PRF) key and initializing an output array to null. The method includes shuffling the non-null elements to generate shuffled locations for the non-null elements. The shuffling may include determining an intermediate shuffled location for a first non-null element. If a location in the output array corresponding to the intermediate shuffled location is null, the shuffling may include outputting a shuffled location as the intermediate shuffled location. If not, the shuffling may include generating an updated intermediate shuffled location. The method includes returning the output array having the first non-null element the location in the output array corresponding to the shuffled location.

20 Claims, 17 Drawing Sheets

(56) References Cited

U.S. PATENT DOCUMENTS

2017/0270046 A1* 9/2017 Fenney ............... G06F 12/0864
2019/0310799 A1* 10/2019 Yeo ....................... G06F 3/0673

OTHER PUBLICATIONS

Yeo, CacheShuffle: A Family of Oblivious Shuffles, 2018, Leibniz International Proceedings in Informatics, Article No. 161; pp. 161:1-161:13 (Year: 2018).*

Xu et al. "Controlled-channel attacks: Deterministic side channels for untrusted operating systems." Security and Privacy (SP), 2015 IEEE Symposium on. IEEE, May 17, 2015.

Lee et al. "Inferring fine-grained control flow inside SGX enclaves with branch shadowing." arXiv preprint arXiv:1611.06952 (Nov. 2016).

Weichbrodt et al. "AsyncShock: Exploiting synchronisation bugs in Intel SGX enclaves." European Symposium on Research in Computer Security. Springer International Publishing, 2016.

Ohrimenko et al. "Oblivious multi-party machine learning on trusted processors." USENIX Security. vol. 16. (May 2016).

Goldreich, Oded. "Towards a theory of software protection and simulation by oblivious RAMs." Proceedings of the nineteenth annual ACM symposium on Theory of computing. ACM, Jan. 1987.

Ohrimenko et al. "The Melbourne shuffle: Improving oblivious storage in the cloud." International Colloquium on Automata, Languages, and Programming. Springer, Berlin, Heidelberg, 2014.

Ajta et al. "An 0 (n log n) sorting network." Proceedings of the fifteenth annual ACM symposium on Theory of commputing. ACM, 1983.

Batcher, Kenneth E. "Sorting networks and their applications." Proceedings of the Apr. 30-May 2, 1968, spring joint commputer conference. ACM, 1968.

Chan et al. "Cache-oblivious and data-oblivious sorting and applications." Proceedings of the Twenty-Ninth Annual ACM-SIAM Symposium on Discrete Algorithms. Society for Industrial and Applied Mathematics, Jan. 7, 2018.

Celis, Pedro, Per-Ake Larson, and J. Ian Munro. "Robin hood hashing." Foundations of Computer Science, 1985., 26th Annual Symposium on. IEEE, 1985.

Mihir Belare and Phillip Rogaway. "Introduction to Modern Cryptography." Chapter 3, "Pseudorandom Functions," 2005.

U.S. Appl. No. 15/857,276, filed Dec. 28, 2017.

* cited by examiner

Input Array 202

| Null 201 | Null 201 | X2 203B | Null 201 | Null 201 | Null 201 | Null 201 | X5 203E |
|---|---|---|---|---|---|---|---|
| L0 | L1 | L2 | L3 | L4 | L5 | L6 | L7 |
| X4 203D | Null 201 | Null 201 | X3 203C | Null 201 | X1 203A | Null 201 | Null 201 |
| L8 | L9 | L10 | L11 | L12 | L13 | L14 | L15 |

Output Array 204A

| Null 205 | Null 205 | Null 205 | Null 205 | Null 205 | Null 205 | Null 205 | Null 205 |
|---|---|---|---|---|---|---|---|
| L0 | L1 | L2 | L3 | L4 | L5 | L6 | L7 |
| Null 205 | Null 205 | Null 205 | Null 205 | Null 205 | Null 205 | Null 205 | Null 205 |
| L8 | L9 | L10 | L11 | L12 | L13 | L14 | L15 |

206

| Element 203 | Initial Locations 208 | Shuffled Locations 210 |
|---|---|---|
| X1 203A | L13 | L6 |
| X2 203B | L2 | L4 |
| X3 203C | L11 | L15 |
| X4 203D | L8 | L0 |
| X5 203E | L7 | L9 |

Output Array 204B

| X4 203D | Null 205 | Null 205 | Null 205 | X2 203B | Null 205 | X1 203A | Null 205 |
|---|---|---|---|---|---|---|---|
| L0 | L1 | L2 | L3 | L4 | L5 | L6 | L7 |
| Null 205 | X5 203E | Null 205 | Null 205 | Null 205 | Null 205 | Null 205 | X3 203C |
| L8 | L9 | L10 | L11 | L12 | L13 | L14 | L15 |

FIG. 2

Approx_Shuffle
Input: Object inp[] of size n, containing t non-null values in arbitrary locations,
PRF key k
Output: Object out[] of size n, is a random shuffle of non null entries in inp[]

```
For i in range(n):             ⎫
    out[i] = null              ⎬ 302
For i in range(n):             ⎭
    if(inp[i] == null)                    ⎫
        continue                          ⎪
    int opt_pos = PRF(k, inp[i])%n ← 306  ⎪ 304
    while(I):                             ⎬
        if(out[opt_pos] == null)          ⎪ ⎫
            out[opt_pos] = inp[i]         ⎪ ⎬ 308
            break                         ⎪ ⎭
        else                              ⎪
            opt_pos = (opt_pos+1) % n ← 310
Return out[]
```

FIG. 3

Input Array 202

| Null 201 | Null 201 | X2 203B | Null 201 | Null 201 | Null 201 | Null 201 | X5 203E |
|---|---|---|---|---|---|---|---|
| L0 | L1 | L2 | L3 | L4 | L5 | L6 | L7 |
| X4 203D | Null 201 | Null 201 | X3 203C | Null 201 | X1 203A | Null 201 | Null 201 |
| L8 | L9 | L10 | L11 | L12 | L13 | L14 | L15 |

Relocated Input Array 402

| X2 203B | X5 203E | X4 203D | X3 203C | X1 203A | Null 201 | Null 201 | Null 201 |
|---|---|---|---|---|---|---|---|
| L0 | L1 | L2 | L3 | L4 | L5 | L6 | L7 |
| Null 201 | Null 201 | Null 201 | Null 201 | Null 201 | Null 201 | Null 201 | Null 201 |
| L8 | L9 | L10 | L11 | L12 | L13 | L14 | L15 |

Sorted Input Array 404

| X1 203A | X4 203D | X5 203E | X2 203B | X3 203C | Null 201 | Null 201 | Null 201 |
|---|---|---|---|---|---|---|---|
| L0 | L1 | L2 | L3 | L4 | L5 | L6 | L7 |
| Null 201 | Null 201 | Null 201 | Null 201 | Null 201 | Null 201 | Null 201 | Null 201 |
| L8 | L9 | L10 | L11 | L12 | L13 | L14 | L15 |

406

| Element 203 | Initial Locations 409 | Shuffled Locations 410 |
|---|---|---|
| X1 203A | L0 | L7 |
| X4 203D | L1 | L4 |
| X5 203E | L2 | L0 |
| X2 203B | L3 | L1 |
| X3 203C | L4 | L9 |

FIG. 4

Output Array 408

| X5 203E | X2 203B | Null 205 | Null 205 | X4 203D | Null 205 | Null 205 | X1 203A |
|---|---|---|---|---|---|---|---|
| L0 | L1 | L2 | L3 | L4 | L5 | L6 | L7 |
| Null 205 | X3 203C | Null 205 | Null 205 | Null 205 | Null 205 | Null 205 | Null 205 |
| L8 | L9 | L10 | L11 | L12 | L13 | L14 | L15 |

| Input Array 202 | | | | | | | |
|---|---|---|---|---|---|---|---|
| Null 201 | Null 201 | X2 203B | Null 201 | Null 201 | Null 201 | Null 201 | X5 203E |
| L0 | L1 | L2 | L3 | L4 | L5 | L6 | L7 |
| X4 203D | Null 201 | Null 201 | X3 203C | Null 201 | X1 203A | Null 201 | Null 201 |
| L8 | L9 | L10 | L11 | L12 | L13 | L14 | L15 |

| Second Sorted Input Array 614 | | | | | | | |
|---|---|---|---|---|---|---|---|
| X3 203C | X4 203D | X1 203A | X2 203B | X5 203E | Null 201 | Null 201 | Null 201 |
| L0 | L1 | L2 | L3 | L4 | L5 | L6 | L7 |
| Null 201 | Null 201 | Null 201 | Null 201 | Null 201 | Null 201 | Null 201 | Null 201 |
| L8 | L9 | L10 | L11 | L12 | L13 | L14 | L15 |

| Element 203 | Initial Locations 619 | Shuffled Locations 620 |
|---|---|---|
| X1 203A | L2 | L7 |
| X2 203B | L3 | L1 |
| X3 203C | L0 | L9 |
| X4 203D | L1 | L4 |
| X5 203E | L4 | L0 |

| Output Array 618 | | | | | | | |
|---|---|---|---|---|---|---|---|
| X5 203E | X2 203B | Null 205 | Null 205 | X4 203D | Null 205 | Null 205 | X1 203A |
| L0 | L1 | L2 | L3 | L4 | L5 | L6 | L7 |
| Null 205 | X3 203C | Null 205 | Null 205 | Null 205 | Null 205 | Null 205 | Null 205 |
| L8 | L9 | L10 | L11 | L12 | L13 | L14 | L15 |

ObliShuffleCached (Approximate_Oblivious Shuffle for data that fits inside cache)
Parameter: s be the number of objects that can fit in one cache line. Approximate number of cache lines available to the program is m
Input: Object inp[] of size n, containing t non-null values in initial locations, PRF key k along with modulo parameter M and shifted parameter S (we have n < m*s )
Output: Object out[] of size n, is a approximate random shuffle of non null entries in inp[] based on PRF key k

Step 1: Choose a random PRF key k'. Sort inp[0:t] based on PRF(k',.) using a memory oblivious sorting
Step 2: create Object out[] of size n, with null entries
Step 3:
```
For i in range(t):
    int opt_pos = PRF(k, inp[i])%M - S
    while(1):
        if(out[opt_pos] == null)
            out[opt_pos] = inp[i]
            break
        else
            opt_pos = (opt_pos+1) % n
Return out[]
```

FIG. 7

Input Array 202

| Null 201 | Null 201 | X2 203B | Null 201 | Null 201 | Null 201 | Null 201 | X5 203E |
|---|---|---|---|---|---|---|---|
| L0 | L1 | L2 | L3 | L4 | L5 | L6 | L7 |
| X4 203D | Null 201 | Null 201 | X3 203C | Null 201 | X1 203A | Null 201 | Null 201 |
| L8 | L9 | L10 | L11 | L12 | L13 | L14 | L15 |

Relocated Input Array 402

| X2 203B | X5 203E | X4 203D | X3 203C | X1 203A | Null 201 | Null 201 | Null 201 |
|---|---|---|---|---|---|---|---|
| L0 | L1 | L2 | L3 | L4 | L5 | L6 | L7 |
| Null 201 | Null 201 | Null 201 | Null 201 | Null 201 | Null 201 | Null 201 | Null 201 |
| L8 | L9 | L10 | L11 | L12 | L13 | L14 | L15 |

Output Array 802A

First Bucket 804A

| Null 806 | Null 806 | Null 806 | Null 806 |
|---|---|---|---|
| L0 | L1 | L2 | L3 |

Second Bucket 804B

| Null 806 | Null 806 | Null 806 | Null 806 |
|---|---|---|---|
| L4 | L5 | L6 | L7 |

Third Bucket 804C

| Null 806 | Null 806 | Null 806 | Null 806 |
|---|---|---|---|
| L8 | L9 | L10 | L11 |

Fourth Bucket 804D

| Null 806 | Null 806 | Null 806 | Null 806 |
|---|---|---|---|
| L12 | L13 | L14 | L15 |

FIG. 8A

Output Array 802B

First Bucket 804A

| X1 203A | Null 806 | Null 806 | Null 806 |
|---|---|---|---|
| L0 | L1 | L2 | L3 |

Second Bucket 804B

| X4 203D | X5 203E | X2 203B | Null 806 |
|---|---|---|---|
| L4 | L5 | L6 | L7 |

Third Bucket 804C

| X3 203C | Null 806 | Null 806 | Null 806 |
|---|---|---|---|
| L8 | L9 | L10 | L11 |

Fourth Bucket 804D

| Null 806 | Null 806 | Null 806 | Null 806 |
|---|---|---|---|
| L12 | L13 | L14 | L15 |

First Bin 804A

| Element 203 | Initial Location 811 | Shuffled Location 813 |
|---|---|---|
| X1 203A | L0 | L3 |
| Null 806 | L1 | NA |
| Null 806 | L2 | NA |
| Null 806 | L3 | NA |

846A

Second Bin 804B

| Element 203 | Initial Location 811 | Shuffled Location 813 |
|---|---|---|
| X4 203D | L4 | L7 |
| X5 203E | L5 | L6 |
| X2 203B | L6 | L4 |
| Null 806 | L7 | NA |

846B

Third Bin 804C

| Element 203 | Initial Location 811 | Shuffled Location 813 |
|---|---|---|
| X3 203C | L8 | L10 |
| Null 806 | L9 | NA |
| Null 806 | L10 | NA |
| Null 806 | L11 | NA |

846C

Output Array 802C

First Shuffled Bucket 805A

| Null 806 | Null 806 | Null 806 | X1 203A |
|---|---|---|---|
| L0 | L1 | L2 | L3 |

Second Shuffled Bucket 805B

| X2 203B | Null 806 | X5 203E | X4 203D |
|---|---|---|---|
| L4 | L5 | L6 | L7 |

Third Shuffled Bucket 805C

| Null 806 | Null 806 | X3 203C | Null 806 |
|---|---|---|---|
| L8 | L9 | L10 | L11 |

Fourth Shuffled Bucket 805D

| Null 806 | Null 806 | Null 806 | Null 806 |
|---|---|---|---|
| L12 | L13 | L14 | L15 |

Approx_Oblivious_Shuffle
Parameter: s be the number of objects that can fit in one cache line. Approximate number of cache lines available to the program is m
Input: Object inp[] of size n, containing t non-null values in arbitrary locations, PRF key k
Output: Object out[] of size n, is a random shuffle of non null entries in inp[]

902 — Step 1: Bring non null entries of inp[] to the beginning of the array (can be done in a single pass using two pointers)

904 — Step 2: create Object out[] of size n, with null entries. Divide the array in n/(m*s) buckets: out[0:m*s], out[m*s:2*m*s], ... , out[n-m*s: n]. Create Boolean overflow[] of size t, initialized to false.

Step 3:
906 — For i in range(n/(m*s))
    count = 0
    For j in range(t)
        overflow = overflow[j]
        out_msi = out[m*s*i]
        inp_j = inp[j]
        opt_pos = PRF(k, inp_j) % n
        if( count < m*s)
            out[m*s*i + count] = inp_j
            if(overflow == true)
                count = count + 1
            else
                if (opt_pos >=m*s*i && opt_pos <m*s*(i+1))
                    count = count + 1
            overflow[j] = false
        else
            out[m*s*i] = out_mki
            if(opt_pos >=m*s*i && opt_pos <m*s*(i+1))
                overflow[j] = true
            else
                overflow[j] = overflow  ⎬ 908
    out[m*s*i : m*s*(i+1)] = ObliShuffleCached(out[m*s*i : m*s*(i+1)], count, PRF key = k, M=n, S=m*s*i)  ⎬ 910

Return out[]

OBLIVIOUS ARRAY SHUFFLING IN TRUSTED EXECUTION ENVIRONMENTS

FIELD

The embodiments discussed herein are related to oblivious array shuffling in trusted execution environments.

BACKGROUND

Hash tables, which may also be referred to as hash maps, are one of the most used data structures with numerous applications. The hash tables are an associative array in which values are mapped to keys based on a hash function. The hash function computes an index in an array where the value may be found. There are several hash functions that dictate how the values are related to the key and indices.

Trusted execution environments (TEE) may include secured areas or secured portions of processors. The TEE may be isolated to ensure security and integrity of operations performed in the TEE and data resulting from such operations.

The subject matter claimed herein is not limited to embodiments that solve any disadvantages or that operate only in environments such as those described. Rather, this background is only provided to illustrate one example technology area where some embodiments described herein may be practiced.

SUMMARY

According to an embodiment, a method of approximate address shuffling of an array may include receiving an array having an array size and two or more non-null elements located in initial-arbitrary locations in the array. The method may include receiving a pseudo-random function (PRF) key. The method may include initializing an output array to null. The method may include shuffling at least a portion of the non-null elements to generate shuffled locations for the non-null elements. The shuffling of a first non-null element of the non-null elements may include determining an intermediate shuffled location for the first non-null element as an application of a PRF to the PRF key and the first non-null element modulo a modulo element. Responsive to a location in the output array corresponding to the intermediate shuffled location being null, the shuffling may include outputting a shuffled location in the output array for the first non-null element as the intermediate shuffled location. Response to the location in the output array corresponding to the intermediate shuffled location not being null, the shuffling may include generating an updated intermediate shuffled location to a sum of the intermediate shuffled location and one modulo the array size. Responsive to a location in the output array corresponding to the updated intermediate shuffled location being null, the shuffling may include outputting the shuffled location in the output array for the first non-null element as the updated intermediate shuffled location. The method may include returning the output array having the first non-null element in the location in the output array that corresponds to the shuffled location.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 2 illustrates example table and example arrays that may be implemented in the array shuffling process of FIG. 1;

FIG. 3 illustrates example pseudocode of an approximate oblivious shuffling algorithm that may be implemented to generate the table and the arrays of FIG. 2;

FIG. 4 illustrates an example table and example arrays that may be implemented in the array shuffling process of FIG. 1;

FIG. 6 illustrates an example table and example arrays that may be implemented in the array shuffling process of FIG. 1;

FIG. 7 is an example pseudocode of another approximate oblivious shuffling algorithm that may be implemented to generate the table and the arrays of FIG. 6;

FIGS. 8A and 8B illustrates example tables and example arrays that may be implemented in the array shuffling process of FIG. 1;

FIG. 9 is an example pseudocode of another approximate oblivious shuffling algorithm that may be implemented to generate the tables and the arrays of FIGS. 8A and 8B;

DESCRIPTION OF SOME EXAMPLE EMBODIMENTS

Hash tables and other arrays may be generated in a trusted execution environment (TEE) and another secure computing environment. It may be beneficial to shuffle the hash tables or the arrays. Shuffling the hash tables or arrays may change locations in the hash tables or the arrays in which data is stored or sorted. Shuffling the hash tables or the arrays may provide an additional security feature and further obscure information related to the hash tables or the arrays from attackers.

Hash tables in some TEE and other secure computing environments may be vulnerable to leakage of some extraneous information due to hash collisions. Accordingly, some embodiments of shuffling processes and resulting shuffled hash tables described in the present disclose may be configured to reduce or eliminate leakage of such extraneous information due to hash collisions. For instance, the resulting shuffled hash tables may be change the locations of data in the hash tables or the arrays, which may obscure the correspondence between locations and the data. Accordingly, the shuffling inside TEE may prevent access to pattern based side channel attacks.

Additionally, shuffling hash tables and arrays may involve large amounts of memory. For example, other shuffle processes such as Melbourne Shuffle may involves an amount of memory that is a function of a square root of the a number of elements being shuffled (e.g., the time may be approximated by $O\sqrt{n}$). Alternatively, other shuffle process may involve a constant or a fixed amount of memory (e.g., the Butcher's sort). Use of large amounts of memory or a constant amount of memory may result in cache misses, which are especially problematic in TEE.

To improve the relatively memory intensive operations of other shuffle processes, some embodiments in the present disclosure are cache friendly. Cache friendly indicates an amount of memory used in the shuffle process is related to and/or limited by a cache available for the shuffle processes. Accordingly, embodiments of the present disclosure provide a technical solution to leakage of extraneous information and further improve the operation of a processing device implementing the shuffling process by limiting the memory used in the shuffling process to an available cache.

These and other embodiments are described with reference to the appended Figures in which like item number indicates like function and/or structure unless described otherwise.

Figure 1:
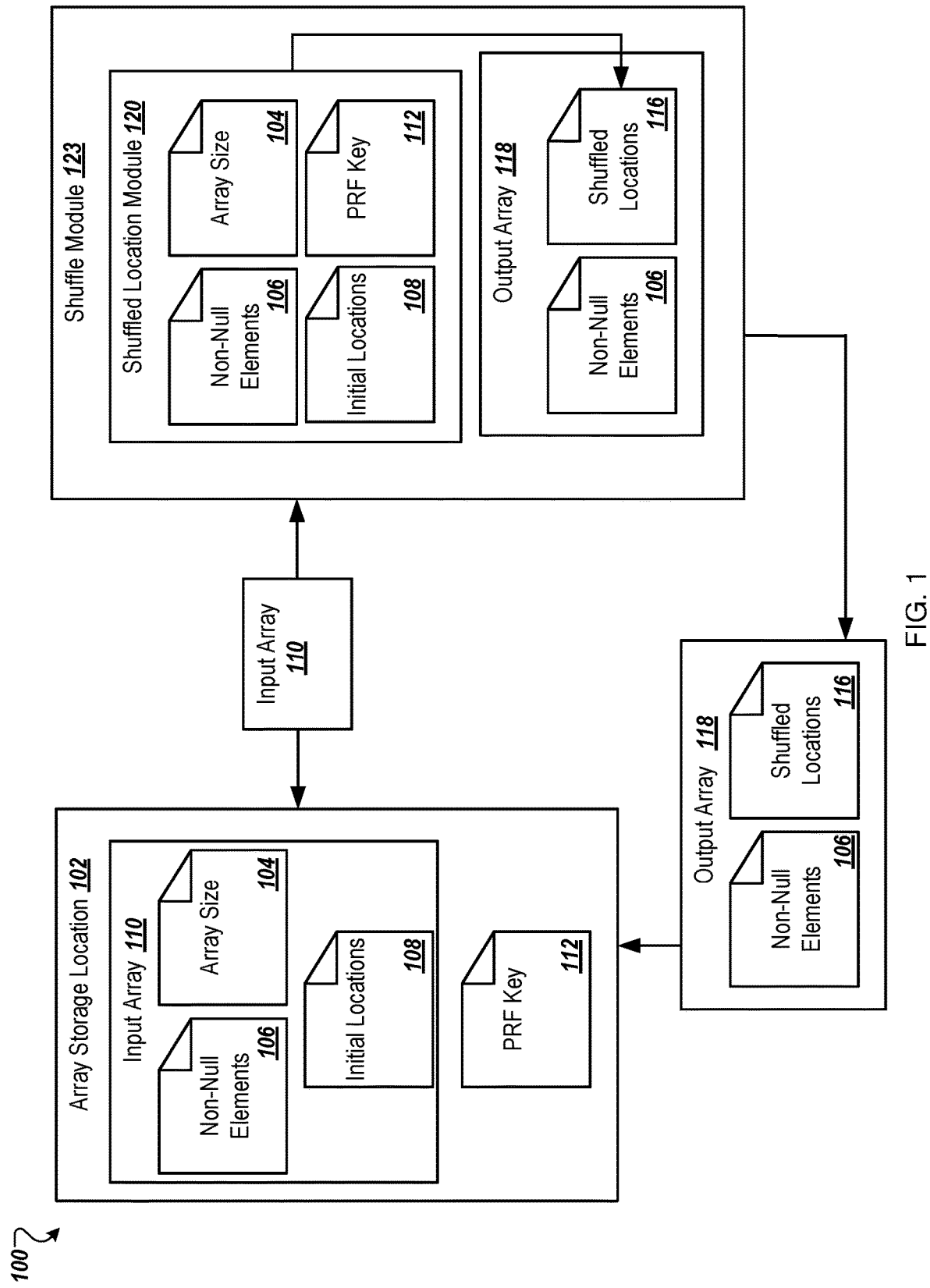
FIG. 1 illustrates an example array shuffling process that may be implemented in some embodiments of the present disclosure.

FIG. 1 illustrates an example array shuffling process (process) 100 that may be implemented in some embodiments of the present disclosure. In FIG. 1, the process 100 is performed through communication of information and data between an array storage location 102 and a shuffle module 123. The array storage location 102 and the shuffle module 123 may be included in a computing system or computing devices such as the computing device of FIG. 15 described elsewhere in the present disclosure.

In the process 100, shuffled locations 116 may be generated by a shuffled location module 120 of a shuffle module 123. The shuffled locations 116 may include new locations or address positions of non-null elements 106. The shuffle module 123 may generate or return an output array 118 in which the shuffled locations 116 may be substituted for the initial locations 108 of an input array 110. The output array 118 that includes the shuffled locations 116 may be improve security of data stored in the input array 110 and extraneous information related to the input array 110.

For instance, in some implementations, the output array 118 may prevent or reduce data leakage that may result due to hash collisions in memory oblivious hash tables. As an example, a hash table may be defined according to the following hash table expressions:

Step 0: $HT=HT_0$;
Step 1: $HT=HT \cup HT_1$;
Step 2: $HT=HT \cup HT_2$;
Step 3: $HT=HT \cup HT_3$; and
Step 4: $HT=HT \cup HT_4$.

In the hash table expressions, a hast table HT in a TEE is initially equal to a first hast table $HT_0$. Subsequently, another hash table $HT_1$ may be added to the hash table in the TEE (HT). In another subsequent step, yet another hash table $HT_2$ is added to the hash table in the TEE. Thus, the TEE maintains the hash table HT and external entities may add elements (e.g., the elements in $HT_1$, $HT_2$, etc.) to the hast table in the TEE, which modifies the hash table. In the hash table defined according to the hash table expressions, extraneous information such as intersections between the hash tables (e.g., $|HT_3 \cap HT_2|$, $|HT_3 \cap HT_1|$, $|HT_3 \cap HT_4|$, etc.) may be leaked. The output array 118 with the shuffled locations 116 may obscure the intersections between the hash tables and prevent the leakage of such extraneous information.

In some embodiments, the generation of the shuffled locations 116 may be based on a key refresh. For example, initial locations 108 may be generated based on a pseudo-random function (PRF) key 112. The PRF key 112 may be refreshed, which may be substantially equivalent to an approximate random shuffling, which may be performed by the shuffle module 123.

In the process 100 of FIG. 1, the input array 110 may have one or more non-null elements 106. The non-null elements may include elements that have some data or a value associated with it. In some embodiments, the input array 110 may be initialized to null such that each location in the input array 110 has a null value. As data is stored or organized into the input array 110, a location in the input array 110 in which the data is stored or organized may become non-null.

The non-null elements 106 may be stored or organized in the input array 110 at initial locations 108. The initial locations 108 may correspond one-to-one with the non-null elements 106. For instance, each of the non-null elements 106 may include an initial location 108 in the input array 110. The initial locations 108 may be arbitrarily assigned to the non-null elements 106. In some embodiments, the initial locations 108 may be assigned using the PRF key 112. For instance, the initial locations 108 may be assigned may be assigned using particular assignment expressions such as the assignment expressions of U.S. application Ser. No. 15/857,276, which is incorporated herein by reference in its entirety or similar assignment expressions.

The input array 110 may include an array size 104. The array size 104 may include a number of locations in the input array 110. The array size 104 may include a sum of the non-null elements 106 and the null elements in the input array 110. The input array 110 may be stored or otherwise accessible at the array storage location 102. In some embodiments, the array storage location 102 may include a particular portion of memory of a computing device (e.g., a processor-based hardware computing device). For instance, the array storage location 102 may include an encrypted portion of the memory on which the input array 110 may be stored.

The shuffle module 123 may be configured to access or receive the input array 110 from the array storage location 102. The shuffle module 123 may generate the output array 118 and initialize the output array 118 to null. The shuffle location module 120 may receive the input array 110, which may include the non-null elements 106, the array size 104, the initial locations 108, the PRF key 112, or some combination thereof. Based on the input array 110, the shuffle location module 120 may implement one or more array shuffling algorithms. Some examples of the shuffling algorithms are provided elsewhere in the present application.

In particular, the shuffling algorithms described in the present disclosure include an approximate shuffling algorithm and two cache-friendly oblivious shuffling algorithms. As used to describe the shuffling algorithms, the term "cache friendly" indicates that the algorithm considers characteristics (e.g., a size, a number of lines, and a number of objects per line) of the cache during a shuffling process. The cache-friendly oblivious shuffling algorithms may be implemented in embodiments in which the cache may be a limited computing resource. For example, the shuffle module 123 may determine whether the number of non-null elements 106 is greater than a particular value that is related to the cache size. For instance, an honest server may include a cache available of about 96 megabyte (MB). Accordingly, the shuffle module 123 may determine whether the amount of data in the input array 110 exceeds the 96 MB. If so, the shuffle module 123 may implement one or more of the cache friendly algorithms.

For instance, one or both of the cache friendly oblivious shuffling algorithms may be implemented in a TEE that implements a level 3 (L3) cache. In some TEE, the L3 cache may between about 6 MB and about 8 MB, which may further reduce the availability of memory to the process 100. Accordingly, the shuffle module 123 may implement one or more of the cache friendly algorithms. Some additional details of a TEE are provided with reference to FIG. 10 and U.S. application Ser. No. 15/857,276. The cache friendly oblivious shuffling algorithms may include steps that reduce a number of cache misses, which may provide additional security benefits relative to other shuffling processes that do not consider the cache available. For instance, the cache friendly algorithms reduce or prevent cache misses, which may be observed by an attacker.

The shuffling algorithms implemented by the shuffled location module 120 may result in the shuffled locations 116 for each of the non-null elements 106. The non-null elements 106 may be stored or organized in the output array 118 at the shuffled locations 116. The shuffle module 123 may return the output array 118. The output array 118 that includes the non-null elements 106 with the shuffled locations 116 may be communicated to the array storage location 102. The output array 118 may be stored in place of the input array 110. Additionally, in a subsequent shuffling, the output array 118 may be shuffled, which may result in another output array that is similar to the output array 118 with updated shuffled locations.

The shuffle module 123 and one or more components or modules thereof described throughout the present disclosure may be implemented using hardware including a processor, a microprocessor (e.g., to perform or control performance of one or more operations), a field-programmable gate array (FPGA), or an application-specific integrated circuit (ASIC). In some other instances, the shuffle module 123 or modules thereof may be implemented using a combination of hardware and software. Implementation in software may include rapid activation and deactivation of one or more transistors or transistor elements such as may be included in hardware of a computing system. Additionally, software defined instructions may operate on information within transistor elements. Implementation of software instructions may at least temporarily reconfigure electronic pathways and transform computing hardware.

Modifications, additions, or omissions may be made to the process 100 without departing from the scope of the present disclosure. The process 100 may be implemented in computing devices as described elsewhere in the present disclosure. The process 100 may be implemented using one or more shuffle modules 123, may be implemented on one or more input arrays 110, may produce one or more output arrays 118, may be implemented using one or more PRF keys 112, or some combination thereof. Moreover, the separation of various components and servers in the embodiments described herein is not meant to indicate that the separation occurs in all embodiments. For example, the shuffle module 123 or some portion thereof may be stored on the array storage location 102. Moreover, it may be understood with the benefit of this disclosure that the described components may generally be integrated together in a single component or server or separated into multiple components or servers.

In FIGS. 2, 4, 6, and 8A and 8B depict example tables and arrays. These tables and arrays include simplified example data and are provided only to illustrate example operations and changes to data and arrays that may occur through implementation of the algorithms represented in FIGS. 3, 5, 7, and 9. Actual operations may include more data in the input array (e.g., 202), which increases the size and complexity of the operations. For example, the size of the tables and arrays may be greater than sixteen locations.

FIG. 2 illustrates example table 206 and example arrays 202, 204A and 204B that may be implemented in the process 100 of FIG. 1. FIG. 3 illustrates example pseudocode of an approximate oblivious shuffling algorithm 300 that may be implemented to generate the table 206 and the arrays 202, 204A and 204B of FIG. 2. Referring to FIG. 2, input array 202 may correspond to the input array 110 of FIG. 1. In the input array 202, there are sixteen locations numbered L0 thru L15. The locations L0, L1, L3, L4, L5, L6, L9, L10, L12, L14, and L15 in the input array 202 are null elements. The null elements are collectively referred to as null elements 201. The input array 202 also includes non-null elements 203A-203E (generally, non-null elements 203 or non-null element 203). A first non-null element 203A is at location L13 of the input array 202. A second non-null element 203B is at location L2 of the input array 202. A third non-null element 203C is at location L11 of the input array 202. A fourth non-null element 203D is at location L8 of the input array 202. A fifth non-null element 203E is at location L7 of the input array 202.

In the embodiment of FIG. 2, the input array 202 includes sixteen locations L0-L15 with five non-null elements 203 and eleven null elements 201. In other embodiments, the input array 202 may include one or more locations with any fraction thereof being null elements 201 and/or non-null elements 203.

The output array 204A may correspond to the output array 118 of FIG. 1. The output array 204 may include sixteen locations L0-L15. In the output array 204A, the locations L0 thru L15 may be initialized to null 205. For instance, each of the locations L0-L15 may be set to null 205. In the embodiment of FIG. 2, the output array 204A includes sixteen locations L0-L15. In other embodiments, the output array 204A may include one or more locations. In the embodiment of FIG. 2, the output array 204A includes a same number of locations as the input array 202. In other embodiments, the number of locations of the output array 204A and the input array 202 may not be the same. For instance, the output array 204A may include more locations than the input array 202.

The table 206 includes initial locations 208 and shuffled locations 210 for each of the non-null elements 203. For example, the first non-null element 203A includes a first initial location L13 and a shuffled location L6. The second non-null element 203B includes a second initial location L2 and a shuffled location L4. The third non-null element 203C includes a third initial location L11 and a shuffled location L15, etc. To generate the shuffled locations 210 the approximate oblivious shuffling algorithm (hereinafter, "Approx_Shuffle") 300 of FIG. 3 may be implemented. In the Approx_Shuffle 300, input may include an input array, an array size of the input array, and a number of non-null elements in the input array. For instance, with reference FIGS. 2 and 3, the input to the Approx_Shuffle 300 may include the input array 202, the array size (e.g., sixteen) of the input array 202 and the number of non-null elements (e.g., five) in the input array 202.

In addition, the Approx_Shuffle 300 may receive a PRF key as an input. The PRF key may be related to the initial locations 208. For instance, the PRF key may be used to assign the initial locations 208 in the input array 202. The PRF key may be generated by sampling a PRF. In general, the PRF may include one or more functions of the pseudorandom family of functions. Some additional details of the pseudorandom function may be found in Mihir Belare and Phillip Rogaway. "Introduction to Modern Cryptography." Chapter 3, *"Pseudorandom Functions,"* 2005, which is incorporated herein by reference in its entirety.

The Approx_Shuffle 300 of FIG. 3 may output an output array having the same size as the input array that includes a random shuffle of the non-null elements of the input array. For example, the Approx_Shuffle 300 may output the output array 204B. In the output array 204B, the non-null elements 203 of the input array 202 are substituted from one or more of the locations L0-15 that have a null 205 value in the output array 204A.

In the Approx_Shuffle 300, an output array is initialized by a first portion 302 of the Approx_Shuffle 300. For example, in the first portion 302, out[i] represents an output array and the "for loop" sets each of the locations in the output array to null. For instance, with reference to FIG. 2, the first portion 302 may result in the output array 204A.

In a second portion 304 of the Approx_Shuffle 300, an intermediate shuffled location may be generated for the non-null elements. In the second portion 304, the parameter "opt_pos" is the intermediate shuffled location. The intermediate shuffled location is generated according to an intermediate shuffled location expression 306. The intermediate shuffled location expression of the Approx_Shuffle 300 is:

$$opt\_pos = PRF(k, inp[i]) \% n.$$

In the intermediate shuffled location expression, opt_pos represents the intermediate shuffled location. The function PRF (,) represents a pseudo-random function that receives as inputs the values in the parenthetical. The parameter k represents the PRF key. The parameter inp[i] represents one of the non-null elements of the input array indexed by the indexing variable i. The function % represents a modulo function. The parameter n represents the array size.

In a third portion 308 of the Approx_Shuffle 300, collisions in the output array are avoided. For example, the third portion 308 includes a while(1) loop that determines whether a location in the output array corresponding to the intermediate shuffled location (out[opt_pos]) is null. Responsive to the location in the output array corresponding to the intermediate shuffled location being null, the intermediate shuffled location is output as a shuffled location in the output array for the non-null element. However, response to the location in the output array corresponding to the intermediate shuffled location not being null, an updated intermediate shuffled location is generated according to an updated intermediate shuffled location expression 310. In the Approx_Shuffle 300, the updated intermediate shuffled location expression 310 is:

$$opt\_pos = (opt\_pos + 1) \% n.$$

In the updated intermediate shuffled location expression 310, the opt_pos on the left side of the equal sign is the updated intermediate shuffled location. The parameter opt_pos on the right side of the equal sign is the intermediate shuffled location described above. The function % and the parameter n are as described above. Thus, the updated intermediate shuffled location is equal to a sum of the intermediate shuffled location and one modulo the array size.

The updated intermediate shuffled location is then processed through the third portion 308 of the Approx_Shuffle 300. The processes in the third portion 308 are performed until the location in the output array corresponding to the updated intermediate shuffled location is null. When the location in the output array corresponding to the updated intermediate shuffled location is null, the updated intermediate shuffled location is output as the shuffled location. The Approx_Shuffle 300 may then return the output array having the non-null elements in the locations in the output array corresponding to the shuffled locations.

Referring to FIG. 2, the shuffled locations 210 correspond to the shuffled locations output by the Approx_Shuffle 300. Additionally, the output array 204B that includes the shuffled locations for the non-null elements 203 may be output by the Approx_Shuffle 300. As described with reference to FIG. 1, the output array 204 may take the place of the input array 110 (or 202) in the array storage location 102.

FIG. 4 illustrates an example table 406 and example arrays 402, 404, and 408 that may be implemented in the process 100 of FIG. 1. FIG. 4 also illustrates the input array 202 of FIG. 2. The Approx_Shuffle 300 of FIG. 3 may be implemented to generate the table 406 and the arrays 402, 404, and 408 of FIG. 4.

Referring to FIG. 4, the input array 202 may correspond to the input array 110 of FIG. 1. In the input array 202 is as described with reference to FIG. 2. FIG. 4 also depicts a relocated input array 402. In the relocated input array 402, the non-null elements 203 of the input array are relocated from the initial locations L2, L7, L8, L11, and L13 to first locations, e.g., L0-L4 in the relocated input array 402. In particular, in the embodiment of FIG. 4, in the input array 202, the first non-null element 203A is at location L13, the second non-null element 203B is at location L2, the third non-null element 203C is at location L11, the fourth non-null element 203D is at location L8, and the fifth non-null element 203E is at location L7. In the relocated input array 402, the non-null elements 203 are relocated to the first locations of the relocated input array 402. In particular, in the relocated input array 402, the first non-null element 203A is at location L4, the second non-null element 203B is at location L0, the third non-null element 203C is at location L3, the fourth non-null element 203D is at location L2, and the fifth non-null element 203E is at location L1.

FIG. 4 also includes a sorted input array 404. In the sorted input array 404, the non-null elements 203 of the relocated input array 402 are sorted. For example, the non-null elements 203 may be sorted using a cache agnostic memory oblivious sort. In particular, in some embodiments, the non-null elements 203 may be sorted based on application of a PRF to the PRF key and the non-null elements. For instance, in some embodiments, the non-null elements 203 may be sorted according to the cache agnostic memory oblivious sort as disclosed in Chan, TH Hubert, et al. CACHE-OBLIVIOUS AND DATA-OBLIVIOUS SORTING AND APPLICATIONS. *Proceedings of the Twenty-Ninth Annual ACM-SIAM Symposium on Discrete Algorithms.* Society for Industrial and Applied Mathematics, 2018, which is incorporated herein by reference in its entirety.

In the sorted input array 404, the non-null elements 203 of the relocated input array 402 are re-ordered. For example, the first non-null element 203A is sorted from L4 to L0, the second non-null element 203B is sorted from L0 to L3, the third non-null element 203C is sorted from L2 to L1, the fourth non-null element 203D is sorted from L2 to L1, and the fifth non-null element 203E is sorted from L1 to L2.

The table 406 includes initial locations 409 and shuffled locations 410 for each of the non-null elements 203. The initial locations 409 in the table 406 correspond to the locations in the sorted input array 404. For example, the first non-null element 203A includes a first initial location L0, the second non-null element 203B includes a second initial location L3, the third non-null element 203C includes a third initial location L4, etc. To generate the shuffled locations 410, the Approx_Shuffle 300 of FIG. 3 may be implemented. The input array received by Approx_Shuffle 300 may include the sorted input array 404. As described above, the Approx_Shuffle 300 may then return the output array having the non-null elements in the locations in the output array corresponding to the shuffled locations.

Referring to FIG. 4, the shuffled locations 410 corresponds to the shuffled locations output by the Approx_Shuffle 300. Additionally, the output array 408 that includes the shuffled locations 410 for the non-null elements 203 may be output by the Approx_Shuffle 300. As described with reference to FIG. 1, the output array 408 may take the place of the input array 110 (or 202) in the array storage location 102.

Figure 5:
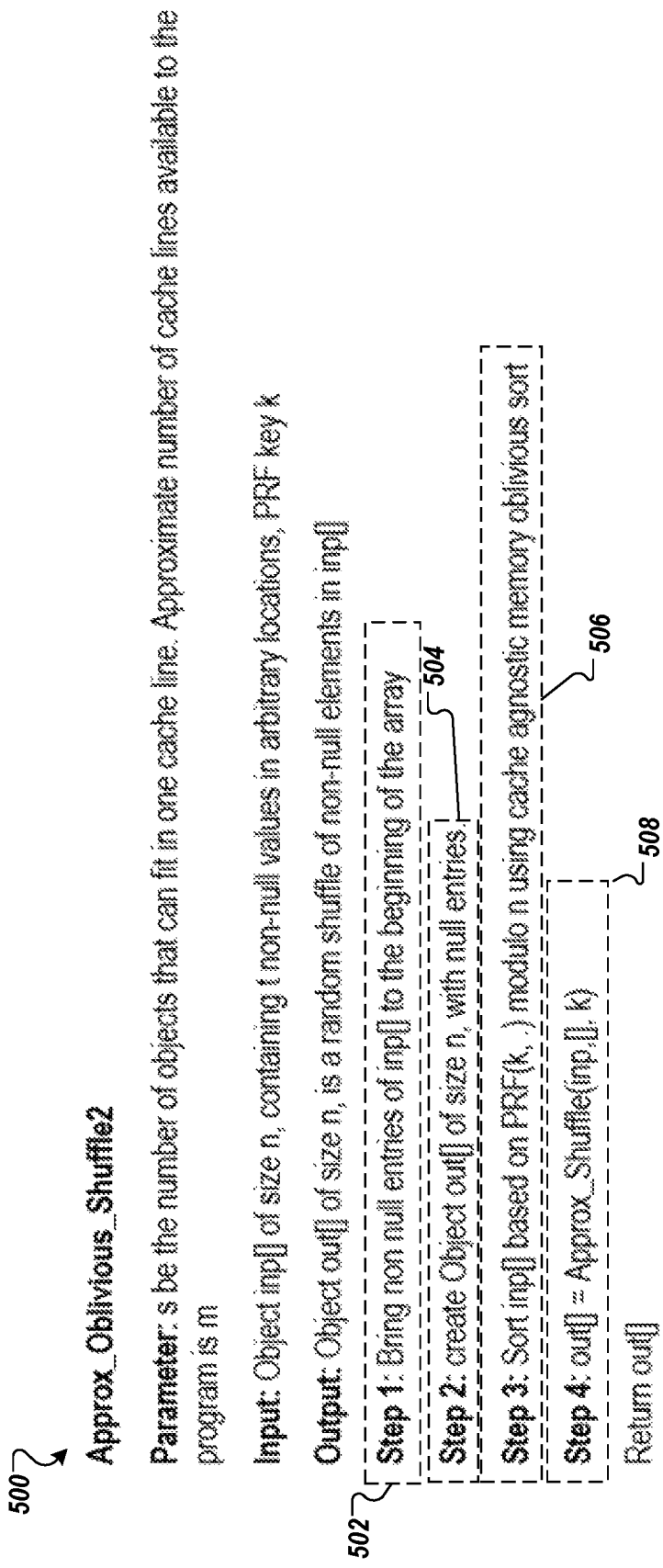
FIG. 5 is an example pseudocode of another approximate oblivious shuffling algorithm that may be implemented to generate the table and the arrays of FIG. 4.

FIG. 5 is an example pseudocode of another approximate oblivious shuffling process (Approx_Oblivious_Shuffle2) 500 that may be implemented to generate the table 406 and the arrays 402 and 404 described with reference to FIG. 4. In the Approx_Oblivious_Shuffle2 500, parameters include a number of objects that fit onto one cache line and a number of cache lines available to the shuffling process. The Approx_Oblivious_Shuffle2 500 receives as input an input array, an array size of the input array, a number of non-null elements in the input array, and a PRF key. For instance, with reference FIG. 4, the input to the Approx_Oblivious_Shuffle2 500 may include the sorted input array 404, the array size (e.g., sixteen) of the sorted input array 404 and the number of non-null elements (e.g., five) in the sorted input array 404. The Approx_Oblivious_Shuffle2 500 may output an output array (out[ ]) having the same size as the input array (inp[ ]) that includes a random shuffle of the non-null elements of the input array. For example, the Approx_Oblivious_Shuffle2 500 may output the output array 408. In the output array 408, the non-null elements 203 of the sorted input array 404 are substituted from one or more of the locations L0-15 that have a null 205 value in the output array 408.

The Approx_Oblivious_Shuffle2 500 includes four steps 502, 504, 506, and 508. A first step 502 includes relocating the non-null elements of the input to a beginning of the input array. As described with reference to FIG. 4, the non-null elements 203 of the input array 202 may be relocated to first locations L0-L4 as shown in the relocated input array 404. At a second step 504, an output array may be generated and initialized. As described with reference to FIGS. 2 and 3, the output array 204A may be generated and initialized to null. At a third step 506, the non-null elements may be sorted. As described with reference to FIG. 4, the non-null elements 203 of the relocated input array 404 may be sorted to generate the sorted input array 404. In the fourth step 508, the Approx_Oblivious_Shuffle2 500 may implement the Approx_Shuffle 300 is implemented as described above.

FIG. 6 illustrates an example table 616 and example arrays 614 and 618 that may be implemented in the process 100 of FIG. 1. FIG. 6 also illustrates the input array 202 of FIG. 2. The input array 202 may correspond to the input array 110 of FIG. 1. In the input array 202 is as described with reference to FIG. 2. For instance, the non-null elements 203 may be located in initial locations L2, L7, L8, L11, and L13. FIG. 6 also includes a second sorted input array 614. In the second sorted input array 614, the non-null elements 203 of the input array 202 are sorted. For example, the non-null elements 203 may be sorted using a memory oblivious sort. The memory oblivious sort may be performed based on an odd-even merge sort or a Butcher's sort. In some embodiments, the second sort input array 614 may be sorted based on application of a PRF to a random PRF key. For instance, the random PRF key may be chosen. The input array 202 may be sorted based on application of the PRF to the random PRF key and the input array 202. Sorting using the random PRF key may be represented by the sort expression:

Sort inp [0:t] based on PRF (k', .).

In the sort expression, inp [0:t] represents the portion of the input array 202 up to a t, which represents the number of non-null elements. The function PRF( ) represents the pseudorandom function that receives as input the values in the parenthetical. The parameter k' represents the random PRF key. The parameter represents '.' a member selection operator.

In the second sorted input array 614 the non-null elements 203 of the input array 202 are re-ordered. For example, the first non-null element 203A is sorted from L4 to L2, the second non-null element 203B is sorted from L0 to L3, the third non-null element 203C is sorted from L3 to L0, the fourth non-null element 203D is sorted from L2 to L1, and the fifth non-null element 203E is sorted from L1 to L4.

The table 616 includes initial locations 619 and shuffled locations 620 for each of the non-null elements 203. The initial locations 619 in the table 616 correspond to the locations in the second sorted input array 614. For example, the first non-null element 203A includes a first initial location L4, the second non-null element 203B includes a second initial location L0, the third non-null element 203C includes a third initial location L3, etc.

FIG. 7 is an example pseudocode of another approximate oblivious shuffling algorithm 700 that may be implemented to generate the table 616 and the arrays 614 and 618 of FIG. 6. For instance, to generate the shuffled locations 620 an oblivious shuffling algorithm for data that fits a particular cache (hereinafter, "ObliShuffleCached") 700 of FIG. 7 may be implemented. The ObliShuffleCached 700 may include parameters that include a number of objects that fit in one cache line and an approximate number of cache lines available in a shuffling process. In the ObliShuffleCached 700, input may include an input array (inp[ ], an array size (n) of the input array, a number of non-null elements in the input array (t). For instance, with reference FIG. 6, the input to the ObliShuffleCached 700 may include the input array 202, the array size (e.g., sixteen) of the input array 202 and the number of non-null elements (e.g., five) in the input array 202. In addition, the ObliShuffleCached 700 may receive a PRF key as an input. The PRF key may be as described with reference to FIGS. 2 and 3. The ObliShuffleCached 700 may receive as input a modulo parameter (M) and a shifted parameter (S).

The ObliShuffleCached 700 of FIG. 7 may output an output array (out [ ]) having the same size as the input array (inp [ ]) that includes a random shuffle of the non-null elements of the input array based on the PRF key. For example, the ObliShuffleCached 700 may output the output array 618 of FIG. 6. In the output array 618, the non-null elements 203 of the input array 202 are substituted from one or more of the locations L0-15 of the output array 618.

The ObliShuffleCached 700 includes three steps 702, 704, and 706. In a first step, a random PRF may be chosen. The non-null elements (e.g., 203) may be sorted. As described with reference to FIG. 6, the non-null elements 203 of the input array 202 may be sorted to generate the second sorted input array 614. At a second step 704, an output array is created and initialized. For example, out[ ] represents an output array with the array size. Each of the locations in the output array is set to null.

In the third step 706 the locations of the input array are shuffled. In a first portion 708 of the third step 706, an intermediate shuffled location may be generated for the non-null elements. In the first portion 708, the parameter "opt_pos" is the intermediate shuffled location. The intermediate shuffled location is generated according to an intermediate shuffled location expression 710. The intermediate shuffled location expression of the ObliShuffleCached 700 is:

$$opt\_pos = PRF(k, inp[i]) \% \ M - S.$$

In the intermediate shuffled location expression, opt_pos represents the intermediate shuffled location. The function PRF (,) represents a pseudo-random function that receives as inputs the values in the parenthetical. The parameter k represents the PRF key. The parameter inp[i] represents one of the non-null elements of the input array indexed by the indexing variable i. The function % represents a module function. The parameter M may represent the modulo parameter, which may include the array size. The parameter S may represent the shifted parameter. In some embodiments, the shifted parameter may be equal to a product of the initial-arbitrary location of one of the non-null elements, the number of available cache lines, and the number of objects that fit into one of the number of available cache lines.

In a second portion 712 of the third step 706 of the ObliShuffleCached 700, collisions in the output array (e.g., the output array 618) are avoided. For example, the second portion 712 includes a while(1) loop that determines whether a location in the output array corresponding to the intermediate shuffled location (out[opt_pos]) is null. Responsive to the location in the output array corresponding to the intermediate shuffled location being null, the intermediate shuffled location is output as a shuffled location in the output array for the non-null element. However, response to the location in the output array corresponding to the intermediate shuffled location not being null, an updated intermediate shuffled location is generated according to the updated intermediate shuffled location expression 310 described with reference to the Approx_Shuffle 300.

The updated intermediate shuffled location is then processed through the second portion 712. The processes in the second portion 712 are performed until the location in the output array corresponding to the updated intermediate shuffled location is null. When the location in the output array corresponding to the updated intermediate shuffled location is null, the updated intermediate shuffled location is output as the shuffled location. The ObliShuffleCached 700 may then return the output array having the non-null elements in the locations in the output array corresponding to the shuffled locations.

Referring to FIG. 6, the shuffled locations 620 correspond to the shuffled locations output by the ObliShuffleCached 700. Additionally, the output array 618 that includes the shuffled locations for the non-null elements 203 may be output by the ObliShuffleCached 700. As described with reference to FIG. 1, the output array 618 may take the place of the input array 110 (or 202) in the array storage location 102.

FIGS. 8A and 8B illustrate an example tables 846A-846C and example arrays 802A-802C that may be implemented in another shuffling process that may be implemented in the process 100 of FIG. 1. FIGS. 8A and 8B also illustrates the input array 202 of FIG. 2 and the relocated input array 402 of FIG. 4.

Referring to FIG. 8A, the input array 202 may correspond to the input array 110 of FIG. 1. In the input array 202 is as described with reference to FIG. 2. FIG. 8A also depicts the relocated input array 402, which is as described with reference to FIG. 4. For instance, in the relocated input array 402, the non-null elements 203 of the input array are relocated from the initial locations L2, L7, L8, L11, and L13 to first locations, e.g., L0-L4 in the relocated input array 402.

FIG. 8A also includes an output array 802A, which may correspond to the output array 118 of FIG. 1. The output array 802A may include sixteen locations L0-L15. As discussed above, the number of locations is for illustrative purposes. Accordingly, in actual operations, the output array 188 and other arrays described in the present disclosure may include more than sixteen locations.

The output array 802A may be divided into multiple buckets 804A-804D (generally, bucket 804 or buckets 804). The buckets 804 may have a bucket size that is less than a cache size of a processing device such as a TEE that stores the output array. The output array 802A may be initialized to null 806. Accordingly, each of the locations in each of the buckets 804 may be set to null 806.

FIG. 8B includes an output array 802B. In the output array 802B, the buckets 804 in the output array may be filled with subsets of the non-null elements 203 of the input array 202. The subsets of the non-null elements 203 may have aggregate sizes that are less than the bucket size. For example, a first aggregate size of a first subset of the non-null elements 203 in a first bucket 804A may be less than the bucket size. The first aggregate size of the first subset may include a sum of the sizes of the non-null elements 203 included in the first bucket 804A. Similarly, a second subset in a second bucket 804B may have a second aggregate size that is less than the bucket size, a third subset in a third bucket 804C may have a third aggregate size that is less than the bucket size, etc. In the output array 802B, the first subset in the first bucket 804A may include the first non-null element 203A; the second subset in the second bucket 804B may include the fourth, the fifth, and the second non-null elements 203D, 203E, and 203B; and the third subset in the third bucket 804C may include the third non-null element 203C. The fourth subset may be empty.

Each of the buckets 804 may be may be shuffled independently. For example, the first bucket 804A may be shuffled independently of the second bucket 804B, the third bucket 804C, and the fourth bucket 804D. None of the non-null elements 203 included in the other buckets 804B and 804C is shuffled with the first non-null element 203A in the first bucket 804A. The shuffled locations 813 for the buckets 804 are included in an output array 802C. Shuffled buckets 805A-805D may be the result of the shuffling of each of the buckets 804 independently. The shuffled buckets 805A-805D may be include in an output array 802C. The tables 846 include initial locations 811 and shuffled locations 813 for each of the buckets 804. For instance, in a first table 846A includes the first non-null element 203A and an initial location 811 and a shuffled location 813 for the first non-null element 203A.

Shuffling the buckets 804 independently may make the shuffling process of cache friendly. For example, a size of the non-null elements 203 in the buckets 804 do not exceed the cache size of a processing device such as a TEE on which the non-null elements 203 are shuffled. Accordingly, the non-null elements 203 being shuffled may all be stored in the cache during the shuffling process. Thus, cache misses may be minimized or eliminated during the shuffling process.

To generate the shuffled locations 813, the ObliShuffleCached 700 of FIG. 7 may be implemented. The input array received by ObliShuffleCached 700 may include one of the buckets 804. The ObliShuffleCached 700 may return one of the shuffled buckets 805A-805D that are included in the output array 802C. As described with reference to FIG. 1, the output array 802C may take the place of the input array 110 (or 202) in the array storage location 102.

FIG. 9 depicts an example pseudocode 900 that may be implemented to perform a process as described with reference to FIGS. 8A and 8B. The pseudocode 900 is hereinafter referred to as Approx_Oblivious_Shuffle 900.

The Approx_Oblivious_Shuffle 900 may include parameters that include a number of objects that can fit in one cache line and an approximate number of cache lines available in a shuffling process. In the Approx_Oblivious_Shuffle 900, input may include an input array (inp[ ]), an array size (n) of the input array, a number of non-null elements in the input array (t). For instance, with reference FIG. 8A, the input to the Approx_Oblivious_Shuffle 900 may include the input array 202, the array size (e.g., sixteen) of the input array 202 and the number of non-null elements (e.g., five) in the input array 202. In addition, the Approx_Oblivious_Shuffle 900 may receive a PRF key as an input. The PRF key may be as described with reference to FIGS. 2 and 3.

The Approx_Oblivious_Shuffle 900 of FIG. 9 may output an output array (out [ ]) having the same size as the input array (inp [ ]) that includes a random shuffle of the non-null elements of the input array based on the PRF key. For example, the Approx_Oblivious_Shuffle 900 may output the output array 802C of FIG. 8B. In the output array 802C, the non-null elements 203 of the input array 202 are substituted from one or more of the locations L0-15 in the output array 802C.

The Approx_Oblivious_Shuffle 900 may include multiple steps 902, 904, and 906. In a first step 902, non-null elements of an input array may be brought to a beginning of an array. For example, with reference to FIG. 8A, the non-null elements 203 of the input array 202 may be relocated to the first locations L0-L4 of the relocated input array 402. The relocations may be performed in a single pass using two pointers in some embodiments.

In a second step 904, an output array may be created having a size that is equal to an array size of the input array. The output array may be divided into multiple buckets. For example, with reference to FIG. 8A, the output array 802A may be divided into the buckets 804. Each of the buckets 804 may include a size that is equal to a cache size. In particular, the output array may be divided into buckets that include a size equal to a size of a cache in a device implementing the Approx_Oblivious_Shuffle 900. In the Approx_Oblivious_Shuffle 900, a bucket size may be determined according to a bucket size expression:

Size=(*m*\**s*).

In the bucket size expression, Size represents the bucket size. The parameter s represents a number of objects that fit in one cache line. The operator * is a multiplication operator. The parameter m represents a number of cache lines available to Approx_Oblivious_Shuffle 900. The buckets may be represented by portions of the output array. For instance, a first bucket may be represented by out[0:m*s], a second bucket may be represented by out[m*s:2*m*s], etc. In addition, in the second step 904, a Boolean overflow may be created that includes a size that is equal to a number of non-null elements in the input array. The Boolean overflow may be initialized to false.

A third step 906 of the Approx_Oblivious_Shuffle 900 determines which of the non-null elements of the input array are included in each of the buckets and shuffles the buckets. For example, a first portion 908 of the third step 906, determines which of the non-null elements are included in the buckets. In the first portion 908, i represents an indexing variable for the bucket. The parameter n represents the array size. The parameter m represents a number of available cache lines. The parameter s represents a number of objects that fit into one of the number of available cache lines. The parameter count represents a counting index variable. The parameter j represents an indexing variable for one of the non-null elements. The parameter out[ ] represents a portion of the output array. The parameter out_pos represents an intermediate output value. The parameter out_msi represents another intermediate output value. The parameter inp_j represents an intermediate input value. The && operator represents a conditional AND operator. The parameter k represents the PRF key. The parameter inp[ ] represents a particular portion of the received array. The % operator represents a modulo operator. The * operator represents a multiplication operator. The == operator represents an equality inquiry operator. The >= operator represents a greater than or equal to operator. The function PRF (k, inp_j) represents a pseudo-random function that receives as input the PRF key and the intermediate input value.

A second portion 910 of the third step 906 shuffles the buckets. In the Approx_Oblivious_Shuffle 900, the ObliShuffleCached 700 of FIG. 7 is used to shuffle each of the buckets independents. The Approx_Oblivious_Shuffle 900 returns an output array (e.g., the output array 802C with shuffled buckets returned from the ObliShuffleCached 700 of FIG. 7.

Figure 10:
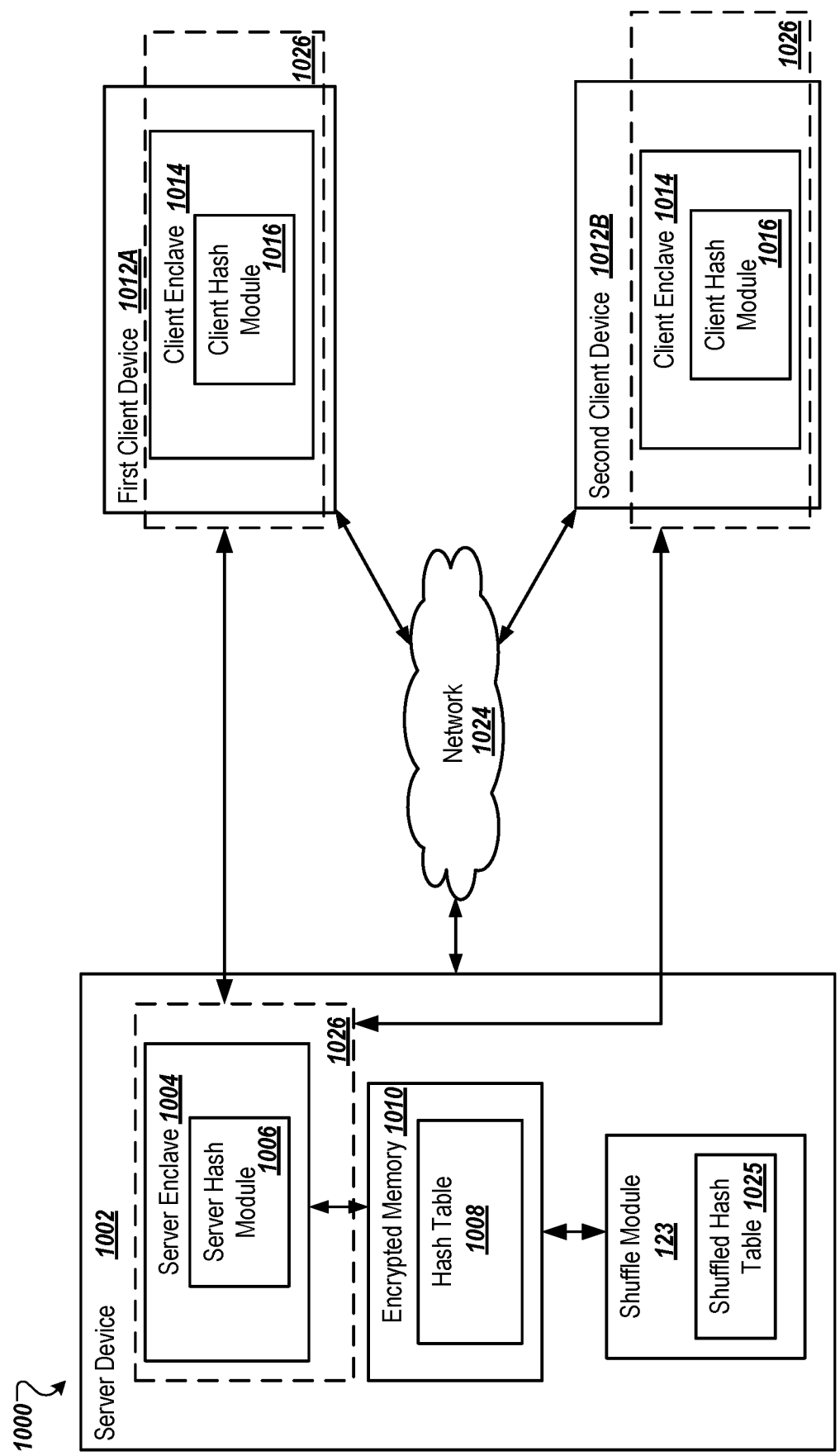
FIG. 10 is a block diagram of an example secure hash environment in which some embodiments may be implemented.

FIG. 10 is a block diagram of an example secure hash environment 1000 in which some embodiments described in the present disclosure may be implemented. For example, in the secure hash environment 1000, a hash table 1008 may be generated in an encrypted memory 1010. The hash table 1008 may be generated in a TEE 1026 that includes a server enclave 1004 and client enclaves 1014 of the secure hash environment 1000. One or more of the shuffle processes described with respect to FIGS. 1-9 may be implemented by the shuffle module 123 to generate the shuffled hash table 1025. The shuffled hash table 1025 may replace the hash table 1008 in the encrypted memory 1010. The hash table 1008 may be an example of the input array 202 described elsewhere in the present disclosure. The shuffled hash table 1025 may be an example of an output array (e.g., 802C, 618, or 408) that may result from one or more of the shuffling processes of FIGS. 1-9.

The shuffled hash table 1025 and processes for its creation may provide a technical solution in the secure hash environment 1000 and other environments. For instance, the hash table 1025 generated in the secure hash environment may be vulnerable to leakage of some extraneous information such as leakage of extraneous information due to hash collisions. In addition, the shuffling processes of FIGS. 1-9 may be cache friendly, which indicates an amount of memory used is related to and/or limited by a cache available for the shuffling processes. Other shuffle processes such as Melbourne Shuffle involves a larger amount of memory (e.g., $O\sqrt{n}$) or take a constant or fixed amount of memory (e.g., the Butcher's sort). Accordingly, these and other shuffling processes do not consider the cache available and may accordingly result in cache misses. This is especially problematic in the secure hash environment 1000 that include the TEE 1026 in which a penalty for the cache miss is high relative to other hash environments. Accordingly, embodiments of the present disclosure provide a technical solution to leakage of extraneous information and improve the operation of a processing device implementing the shuffling process by limiting the memory used in the shuffling process to an available cache. Some details of the secure hash environment 1000 are provided below. Some additional details of the secured hash environment 1000 and components thereof may substantially as described in U.S. application Ser. No. 15/857,276.

In the secure hash environment 1000, the TEE 1026 may include the server enclave 1004 of a server device 1002 and the client enclaves 1014 of client devices 1012A and 1012B. The TEE 1026 may include software guard extensions (SGX) in some embodiments. The SGX may be implemented or provided by INTEL®. In other embodiments, another suitable TEE technology may be implemented in the secure hash environment 1000.

Generally, the TEE 1026 may provide a strong security guarantee in the secure hash environment 1000. For instance, the secure hash environment 1000 may be characterized as a cloud network because the client devices 1012A and 1012B are connected to the server device 1002 by a network 1024. The TEE 1026 may provide the strong security guarantee in the cloud network that includes a complete confidentiality of client data communicated in the secure hash environment 1000. The security guarantee provided by the TEE may be provided even as computations are performed on the client data that is stored on the server enclave 1004 of the server device 1002.

The secure hash environment 1000 may be configured to implement a secure hash algorithm between the server enclave 1004 and the client enclaves 1014. The secure hash algorithm may provide a data storage structure and organization technique that overcomes some of the disadvantages of the ORAM while mitigating the vulnerabilities. For example, the secure hash environment 1000 may help protect against adversarial cache fault attacks and other attacks that attempt to infer a secret stored in the secure hash environment 1000 based on memory access patterns.

The secure hash environment 1000 may include the client devices 1012A and 1012B (generally, client device 1012 or client devices 1012) that are communicatively coupled to the server device 1002 via the network 1024. Data and information may be communicated between the client devices 1012 and the server device 1002 via the network 1024. The client devices 1012, the network 1024, and the server device 1002 are described below.

The network 1024 may include any communication network configured for communication of signals between any of the client devices 1012 and the server device 1002 of the secure hash environment 1000. The network 1024 may be wired or wireless. The network 1024 may have numerous configurations including a star configuration, a token ring configuration, or another suitable configuration. Furthermore, the network 1024 may include a local area network (LAN), a wide area network (WAN) (e.g., the Internet), and/or other interconnected data paths across which multiple devices may communicate. In some embodiments, the network 1024 may include a peer-to-peer network. The network 1024 may also be coupled to or include portions of a telecommunications network that may enable communication of data in a variety of different communication protocols. In some embodiments, the network 1024 includes or is configured to include a BLUETOOTH® communication network, a Wi-Fi communication network, a ZigBee communication network, an extensible messaging and presence protocol (XMPP) communication network, a cellular communications network, any similar communication networks, or any combination thereof for sending and receiving data. The data communicated in the network 1024 may include data communicated via short messaging service (SMS), multimedia messaging service (MMS), hypertext transfer protocol (HTTP), direct data connection, wireless application protocol (WAP), e-mail, or any other protocol that may be implemented with the client devices 1012 and the server device 1002.

The client devices 1012 and the server device 1002 may include any computer-based or hardware-based computing system. The client devices 1012 and the server device 1002 may be configured to communicate with one another via the network 1024 in the secure hash environment 1000. The client devices 1012 may be associated with or operated by a user or set of users. The users associated with the client devices 1012 may be strangers or may be generally disassociated from one another.

The client devices 1012 may include the client enclave 1014 and the server device 1002 may include the server enclave 1004. The client enclave 1014 and the server enclave 1004 are protected areas of execution in the memory of the client devices 1012 and the server device 1002, respectively. Special instructions may be implemented to store application code in the client enclave 1014 and the server enclave 1004. For example, in embodiments implementing the Intel® SGX, one or more software development kits (SDK) or application programming interfaces (APIs) may be provided that enable the storage and implementation of application code in the client enclave 1014 and the server enclave 1004.

Generally, the client devices 1012 may be configured to communicate data and information to the server device 1002. The server device 1002 may be configured to receive the data from the client devices 1012 and may be configured to perform some operations on the received data. For example, the server device 1002 may be configured to implement a genome-wide association study (GWAS). In these embodiments, the client devices 1012 may communicate genetic records of users or data representative thereof to the server device 1002. The server device 1002 may then process the DNA to identify genes that may be associated with a disease. In another embodiment, the server device 1002 may be configured to implement a survey, a poll, or a census. In these and other embodiments, the client devices 1012 may be configured to communicate individual responses to the server device 1002. The server device 1002 may process the responses to generate a poll result, a census statistic, or a survey result.

In some embodiments of the secure hash environment 1000, the data communicated via the network 1024 may be sensitive. For instance, the genetic records and/or the individual responses may be considered private. Accordingly, the server device 1002 may be configured to receive, organize, and process the received data in a way in which privacy and security of the received data is maintained. For example, the server device 1002 may include a server hash module 1006 and the client devices 1012 may include a client hash module 1016 which may be configured to implement the secure hash operations, which may maintain privacy and security of the received data.

The server hash module 1006, the client hash module 1016, and one or more components or modules thereof described throughout the present disclosure may be implemented using hardware including a processor, a microprocessor (e.g., to perform or control performance of one or more operations), a field-programmable gate array (FPGA), or an application-specific integrated circuit (ASIC). In some other instances, the server hash module 1006 and the client hash module 1016 may be implemented using a combination of hardware and software. Implementation in software may include rapid activation and deactivation of one or more transistors or transistor elements such as may be included in hardware of a computing system (e.g., the server device 1002 or the client device 1012). Additionally, software defined instructions may operate on information within transistor elements. Implementation of software instructions may at least temporarily reconfigure electronic pathways and transform computing hardware.

The secure hash operations may be configured to generate the hash table 1008 in which hashes of input data may be organized and stored. The hash table 1008 may be memory oblivious. The hashes may be subsequently retrieved and accessed in the secure hash environment 1000. In the embodiment of FIG. 10, the secure hash environment 1000 includes the hash table 1008. In other embodiments, the secure hash environment 1000 may include an associative array, a dictionary, or another suitable data structure.

For example, in some embodiments, the server hash module 1006 of the server device 1002 may be configured to perform one or more setup processes for the secure hash operations. The setup processes may include a secret key exchange between the server enclave 1004 of the server device 1002 and the client hash module 1016 of the client device 1012. The exchanged secret keys in the secure hash environment 1000 may include asymmetric keys (e.g., private and public key pair(s)) and/or symmetric key(s).

The server hash module 1006 and/or the client hash module 1016 may be configured to establish an encrypted channel between the server enclave 1004 and the client enclave 1014. For example, the data and information communicated between the server enclave 1004 and the client enclave 1014 may be encrypted using the exchanged secret keys. Accordingly, most or all of the data and information on the encrypted channel may be ciphertext that may be subsequently decrypted, stored, processed, etc.

The server hash module 1006 may generate a random key for a keyed hash function of a pseudorandom function (PRF). The keyed hash function may be based on a secure hash algorithm (SHA) that includes SHA-1, SHA-2, or SHA-3. In some embodiments, the generation of the random key may include sampling a PRF. In general, the PRF may include one or more functions of the pseudorandom family of functions.

The server hash module 1006 may then communicate the random key to the client enclaves 1014 of the client devices 1012 via the encrypted channel. The client devices 1012 may receive the random key. In some embodiments, the generation of the random key may only be performed once. The random key may accordingly be stored at the client device 1012 and the server device 1002 and used throughout interaction therebetween.

The client device 1012 may also receive or generate input data. The input data may include any data or information that is communicated to or related to data that is communicated the server device 1002. For instance, as discussed above, the input data may include genetic records or the response data. The client hash module 1016 may hash the input data. For example, the client hash module 1016 may implement a hash function to generate keys that are related to the input data. In some embodiments, the hash module 1016 may use any non-cryptographic hash function to hash the input data. Some examples of the non-cryptographic hash function may include MurmurHash, DJB2, and the like. The client hash module 1016 may then communicate hashes of the input data to the server enclave 1004. The hashes may be communicated via the encrypted channel.

The server enclave 1004 may receive the hashes from the client enclaves 1014. Based on key-value pairs included in the received hashes, the server enclave 1004 may build the hash table 108. In some embodiments, the hashes may include the input data. In other embodiment, the input data may not be communicated to the server enclave 1004.

In the depicted embodiment, the hash table 1008 may be built and/or stored in an encrypted memory 1010. The encrypted memory 1010 may provide an additional level of security. In other embodiments, the hash table 1008 may be included in another memory, which may not be encrypted.

Following building of the hash table 1008, the client devices 1012 may generate a hash table query. The client hash module 1016 may communicate the hash table query to the server enclave 1004. Responsive to the hash table query, the server hash module 1006 may retrieve values that correspond to keys included in the hash table query. The server hash module 1006 may return the retrieved values that correspond to the keys or a null if a corresponding key has not been inserted into the hash table 1008.

As described above, in some embodiments, query collisions may be leaked by the server device 1002. However, the rest of the hashes are not available and are not leaked. As used in the present disclosure, "leaked" indicates that the query collisions are vulnerable to being revealed to an unauthorized entity following a particular set or series of interactions between the server device 1002 and the client devices 1012. Thus, the distribution of the query collisions even when accessed by unauthorized entities may not reveal much if any information about the input data. For example, in response to the clients 1012 making the same hash table query multiple times, an adversarial server or another unauthorized entity may be able to deduce a distribution of query patterns. However, the adversarial server may not be able to deduce actual content of the queries.

Additionally, the hashes communicated to the server device 1002 by a first client device 1012A and a second client device 1012B may result in different positions in the hash table 1008. In these and other circumstances, the server hash module 1006 may be configured to merge the hashes into the hash table 1008. In some embodiments, the merging may be an addition operation. For example, when values include a same random key, the hashes may be merged using an addition operation.

Figure 11:
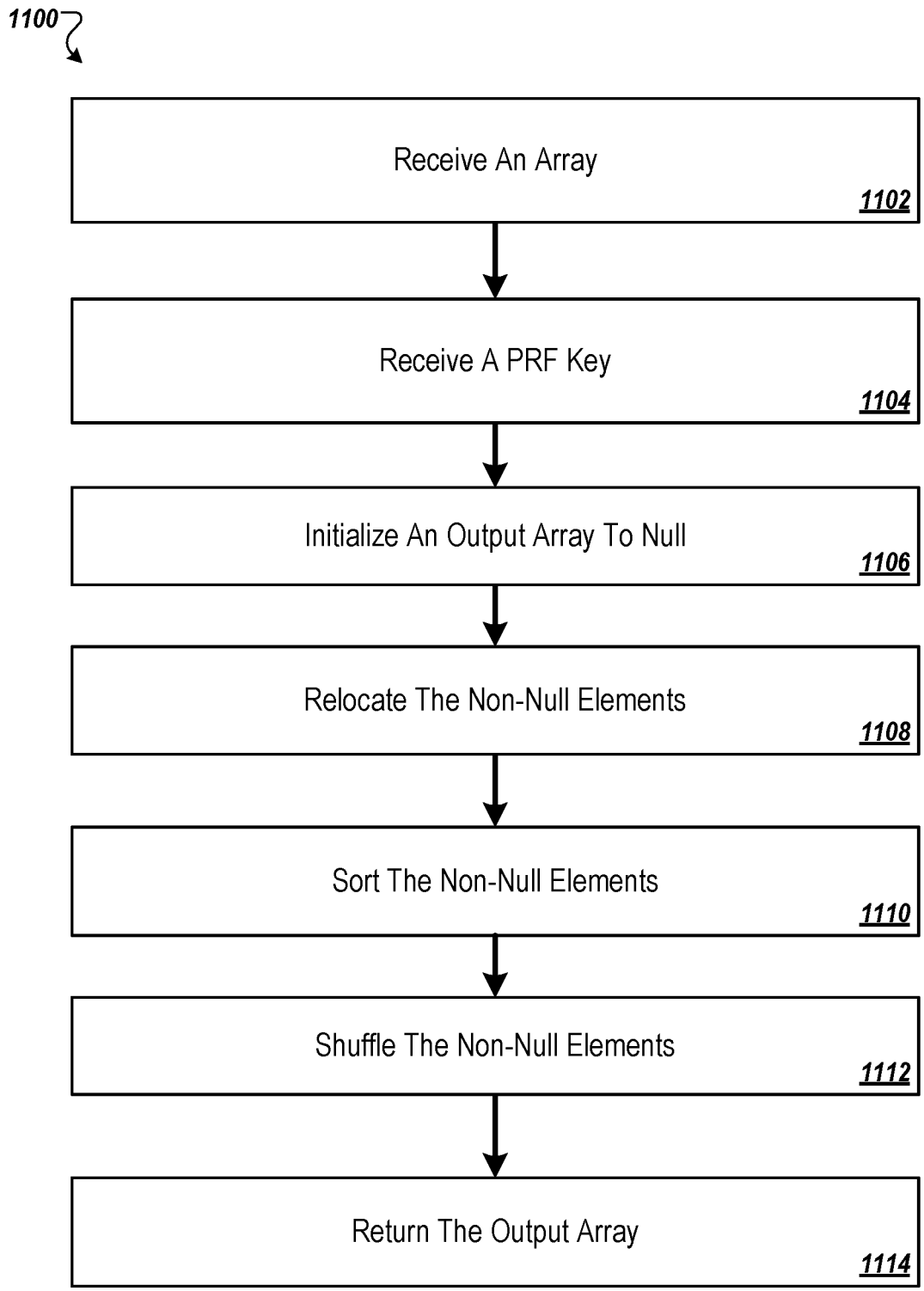
FIG. 11 is a flowchart of an example method of approximate address shuffling of an array.

Modifications, additions, or omissions may be made to the secure hash environment 1000 without departing from the scope of the present disclosure. For example, the secure hash environment 1000 may include one or more server devices 1002, one or more client devices 1012, one or more networks 1024, or any combination thereof. Moreover, the separation of various components and servers in the embodiments described herein is not meant to indicate that the separation occurs in all embodiments. Moreover, it may be understood with the benefit of this disclosure that the described components and servers may generally be integrated together in a single component or server or separated into multiple components or servers.

FIG. 11 is a flowchart of an example method 1100 of approximate address shuffling of an array according to at least one embodiment described in the present disclosure. Although illustrated as discrete blocks, various blocks in FIG. 11 may be divided into additional blocks, combined into fewer blocks, or eliminated, depending on the desired implementation.

The method 1100 may begin at block 1102, in which an array may be received. The array may have an array size. Additionally, the array may include two or more non-null elements, which may be located in initial locations in the array. The initial locations may be arbitrarily assigned and/or may be assigned using a particular assignment expression such as the assignment expressions of U.S. application Ser. No. 15/857,276 or similar assignment expressions. At block 1104, a PRF key may be received. The PRF key may include the PRF key that is used in the particular assignment expression or that is otherwise related to the initial locations.

At block 1106, an output array may be initialized to null. For example, in some embodiments a null value may be entered into each element of the output array. At block 1108, the non-null elements may be relocated. For example, the non-null elements of the received array may be relocated from the initial-arbitrary locations to first locations in the received array. For instance, one of the non-null elements may be relocated to a first location in the received array and the remaining non-null elements may be relocated to the immediately subsequent locations in the received array.

At block 1110, the non-null elements may be sorted. In some embodiments, the non-null elements may be sorted using a cache agnostic memory oblivious sort. Additionally, the non-null elements based on application of a PRF to the PRF key and the non-null elements. Sorting the non-null elements may re-arrange the sequence of the non-null elements in the received array. For example, a first non-null element may be located in a first location L0 of the received array, a second non-null element may be located in a second location L1 of the received array, etc. Following the sort, the first non-null element may be located in the second location L1 and the second non-null element may be located in the first location L0.

At block 1112, at least a portion of the non-null elements may be shuffled. The non-null elements or portion thereof may be shuffled to generate shuffled locations for the non-null elements. Shuffling the non-null elements may be performed according to one or more approximate oblivious shuffling algorithms. The approximate oblivious shuffling algorithms may be particularly suitable for dictionary merging in TEE. For instance, the approximate oblivious shuffling algorithms may be configured to handle multiple empty locations in the received array and may be configured to resolve collisions during the shuffle. At block 1114, the output array may be returned. The output array may have the non-null elements located in the shuffled locations. The shuffled locations may prevent or substantially prevent leakage of extraneous information that may be otherwise leaked from memory oblivious hash tables. For example, in some embodiments, the received array may include a hash table in a TEE such as a SGX. The hash table may be generated according to the processes described in U.S. application Ser. No. 15/857,276 or another suitable process. The output array may include the hash table with the non-null elements located in the shuffled locations.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 12:
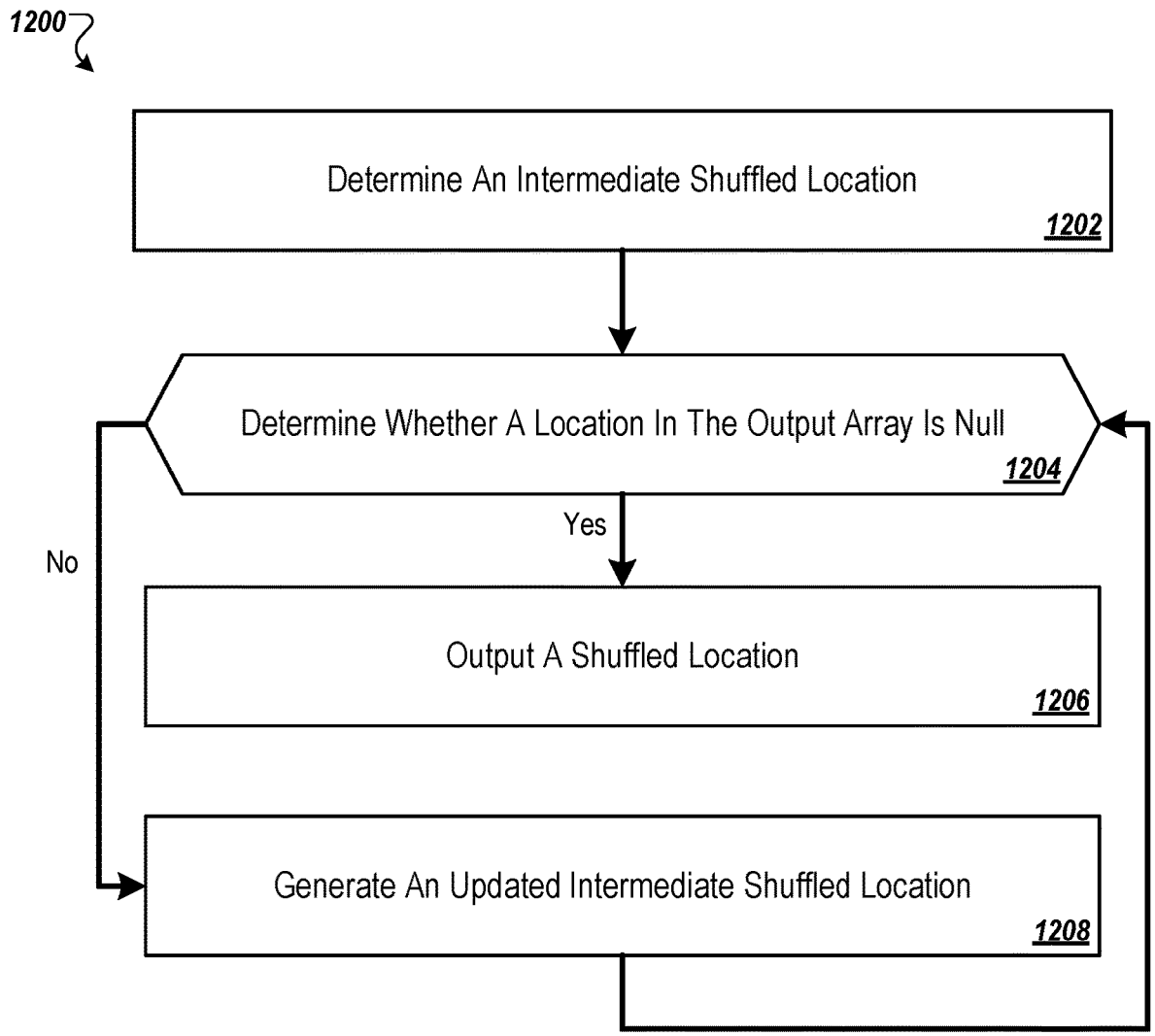
FIG. 12 is a flow chart of an example method of shuffling a non-null element.

FIG. 12 is a flow chart of an example method 1200 of shuffling a non-null element according to at least one embodiment described in the present disclosure. Although illustrated as discrete blocks, various blocks in FIG. 12 may be divided into additional blocks, combined into fewer blocks, or eliminated, depending on the desired implementation. In some embodiments, the method 1200 may be implemented as sub-process in another method. For instance, the method 1200 may be implemented in block 1112 of FIG. 11.

The method may begin at block 1202. At block 1202, an intermediate shuffled location may be determined. The intermediate shuffled location may be determined for a first non-null element of two or more non-null elements in an array or a hash table. The intermediate shuffled location may be determined according to an intermediate shuffled location expression. In some embodiments, the intermediate shuffled location expression may include an application a PRF to a PRF key and the first non-null element modulo a modulo element. An example of the intermediate shuffled location expression may be:

$$opt\_pos = PRF(k, inp[i]) \% M.$$

In the intermediate shuffled location expression, opt_pos may represent the intermediate shuffled location, PRF( ) may represent the PRF expression. The parameter k may represent the PRF key. The parameter inp[i] may represent the first non-null element. As used here, the "first" does not indicate that the first non-null element is located in a first location or comes before another non-null element. The operator % represents a modulo operator. The parameter M may represent the module element. The modulo element may include an array size of the array or the hash table.

At block 1204, it may be determined whether a location in an output array is null. For instance, when the method 1200 proceeds from block 1202 to block 1204, it may be determined whether the a location in the output array corresponding to the intermediate shuffled location is null. Alternatively, when the method 1200 proceeds from block 1208 to block 1204, it may be determined whether the a location in the output array corresponding to the updated intermediate shuffled location is null. Responsive to the location in the output array being null ("YES" at block 1204), the method 1200 may proceed to block 1206. Alternatively, responsive to the location in the output array being non-null ("NO" at block 1204), the method 1200 may proceed to block 1208.

At block 1206, a shuffled location may be output. The shuffled location may be set to the intermediate shuffled location or the updated intermediate shuffled location. For instance, when the method 1200 proceeds from block 1202, to block 1204, and to block 1206, the shuffled location may be set to the intermediate shuffled location. Alternatively, when the method 1200 proceeds from block 1208, to block 1204, and to block 1206, the shuffled location may be set to the updated intermediate shuffled location. The shuffled location may include a new location of the first non-null element in the output array for the first non-null element as the intermediate shuffled location.

At block 1208, an updated intermediate shuffled location may be generated. The updated intermediate shuffled location may be generated accordingly to an updated intermediate shuffled location expression. The updated intermediate shuffled location expression may include a sum of the intermediate shuffled location (or a previous updated intermediate shuffled location) and one modulo the array size. For instance, the updated intermediate shuffled location expression may include:

$$opt\_pos1=(opt\_pos+1)\% \; n.$$

In the updated intermediate shuffled location expression, opt_pos1 may represent the updated intermediate shuffled location. The parameter n may represent the array size. The remaining parameters are as described above. From block 1208, the method 1200 may proceed to blocks 1204 and 1208 until the shuffle location is output at block 1206.

Figure 13A:
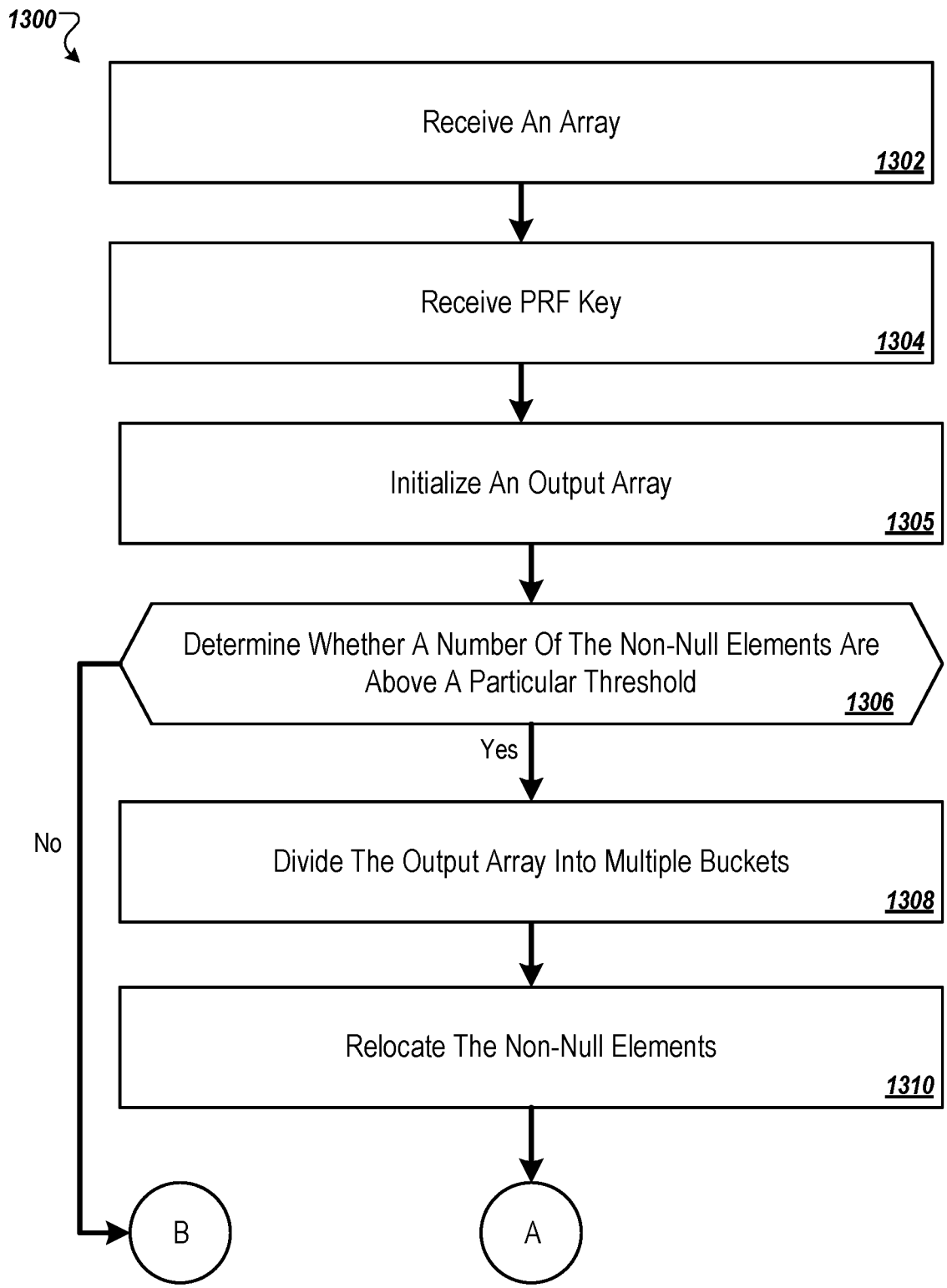
FIGS. 13A and 13B are a flow chart of another example method of approximate address shuffling of an array.
Figure 13B:
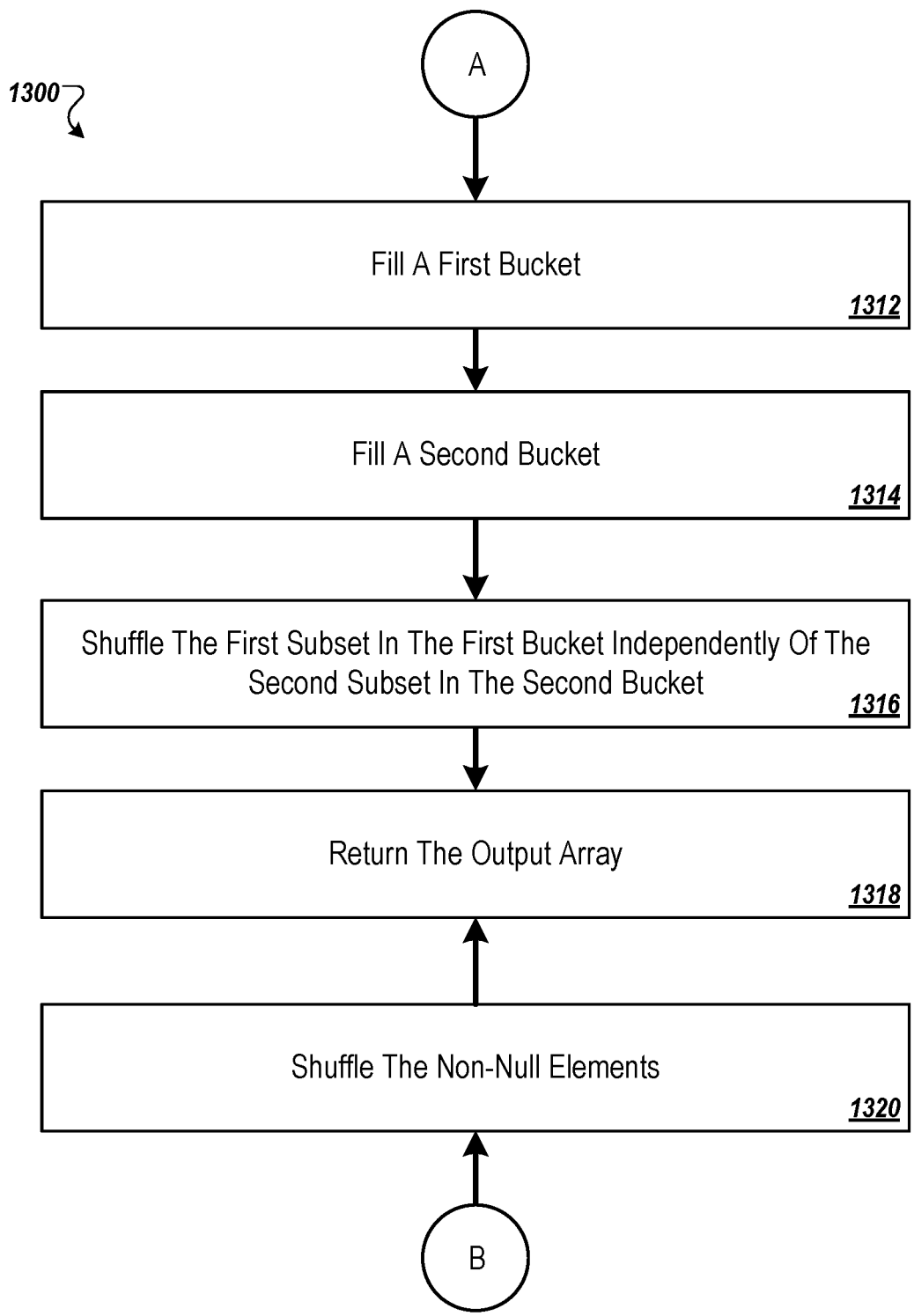

FIGS. 13A and 13B are a flow chart of an example method 1300 of approximate address shuffling of an array according to at least one embodiment described in the present disclosure. Although illustrated as discrete blocks, various blocks in FIGS. 13A and 13B may be divided into additional blocks, combined into fewer blocks, or eliminated, depending on the desired implementation.

The method 1300 may begin at block 1302, in which an array may be received. As described with reference to the method 1100, the array may have an array size and may include two or more non-null elements, which may be located in initial locations in the array. The initial locations may be arbitrarily assigned and/or may be assigned using a particular assignment expression such as the assignment expressions of U.S. application Ser. No. 15/857,276 or similar assignment expressions. At block 1304, a PRF key may be received. The PRF key may include the PRF key that is used in the particular assignment expression or that is otherwise related to the initial locations.

At block 1305, an output array may be initialized to null. For example, in some embodiments a null value may be entered into each element of the output array.

At block 1306, it may be determined whether a number of the non-null elements are above a particular threshold. The particular threshold may be related to a cache capability or an available cache capability of a processing device such as a TEE implementing the method 1300. In response to the number of non-null elements being greater than the particular threshold ("YES" at block 1306), the method 1300 may proceed to blocks 1308, 1310, 1312, 1314, 1316, and 1318. In response to the number of non-null elements being less than (or equal to) the particular threshold ("NO" at block 1306), the method 1300 may proceed to block 1320.

At block 1308, the output array may be divided into multiple buckets. In some embodiments, the output array may be divided into multiple buckets in which each of the multiple buckets have a bucket size that is less than a cache size of a processing device such as a TEE that stores the output array. At block 1310, the non-null elements may be relocated. For instance, the non-null elements of the received array may be relocated from the initial-arbitrary locations to first locations in the received array. For instance, the non-null elements of the received array may be relocated to a first location L0, a second location L1, etc.

Referring to FIG. 13B, at block 1312 a first bucket may be filled. For instance, a first bucket of the multiple buckets may be filled with a first subset of the non-null elements. The first subset may include the non-null elements having a first aggregate size that is less than the bucket size. For example, the first bucket may be filled with three of the non-null elements having an aggregate size that is less than the bucket size. At block 1314, a second bucket may be filled. For instance, the second bucket of the multiple buckets may be filled with a second subset of the non-null elements. The second subset may include the non-null elements having a second aggregate size that is less than the bucket size. In some embodiments, the filling of the first bucket and/or the second bucket may be performed using to a Boolean overflow expression. An example of the Boolean overflow expression is described elsewhere in the present disclosure. Filling the first bucket may be performed using an algorithm such as the third step 906 of the Approx_Oblivious_Shuffle 900 of FIG. 9.

At block 1316, the first subset in the first bucket may be shuffled independently of the second subset in the second bucket. The first subset in the first bucket may be shuffled to generate shuffled locations for the non-null elements. Shuffling the first subset in the first bucket may be performed according to one or more approximate oblivious shuffling algorithms. Examples of the approximate oblivious shuffling algorithms are described elsewhere in the present disclosure.

At block 1318, the output array may be returned. The output array may have the non-null elements located in the shuffled locations. The shuffled locations may prevent or substantially prevent leakage of extraneous information that may be otherwise leaked from memory oblivious hash tables. For example, in some embodiments, the received array may include a hash table in a TEE such as a SGX. The hash table may be generated according to the processes described in U.S. application Ser. No. 15/857,276 or another suitable process. The output array may include the hash table with the non-null elements located in the shuffled locations.

At block 1320 the non-null elements may be shuffled. The non-null elements may be shuffled according to one or more approximate oblivious shuffling algorithms. For instance, the non-null elements may be shuffled according to the method 1200.

Figure 14:
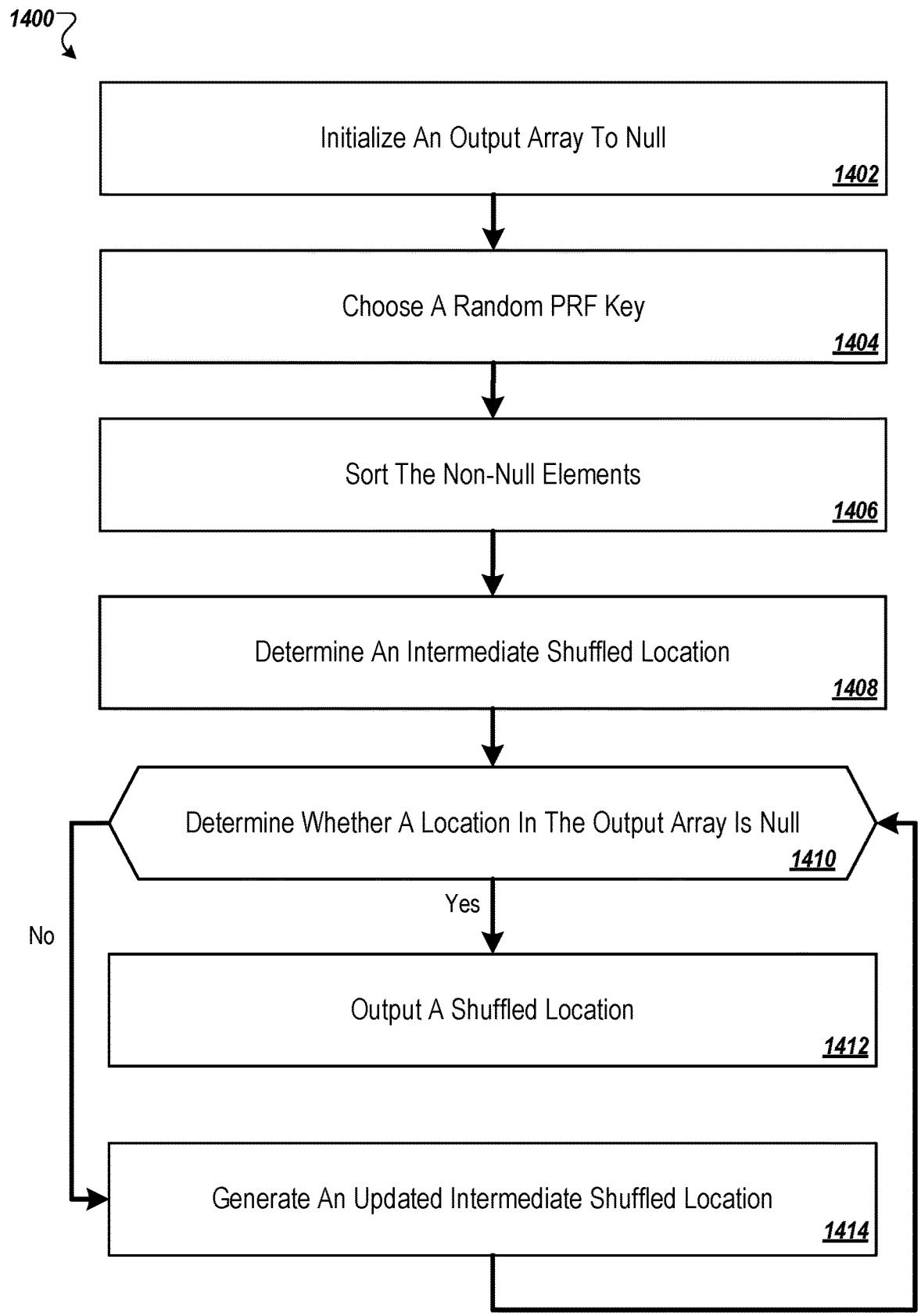
FIG. 14 is a flow chart of another example method of shuffling a non-null element.

FIG. 14 is a flow chart of an example method 1400 of shuffling a non-null element according to at least one embodiment described in the present disclosure. Although illustrated as discrete blocks, various blocks in FIG. 14 may be divided into additional blocks, combined into fewer blocks, or eliminated, depending on the desired implementation.

The method 1400 may begin at block 1402, in which an output array may be initialized to null. For instance, each element of the output array may be set to null. At block 1404, a random PRF key may be chosen. At block 1406, the non-null elements may be sorted. The non-null elements may be sorted using a memory-oblivious sort. For instance, the non-null elements may be based on application of a PRF to the random PRF key and the non-null elements. The sorting may be based on a sort expression:

Sort inp[0:t] based on PRF(k',•).

In the sort expression, the inp [0:t] represents the non-null elements from an indexing variable 0 to an indexing variable t. PRF represents the pseudo-random function. The parameter k' represents the random PRF. The parameter • represents entry of the non-null elements from the non-null elements. The sorting may include sorting according to an odd-even merge sort. For instance, sorting may be performed using a Butcher's sort.

At block 1408, an intermediate shuffled location may be determined. The intermediate shuffled location may be determined for a first non-null element of two or more non-null elements in an array or a hash table. The intermediate shuffled location for the first non-null element further includes a difference between the application a PRF to the PRF key and the first non-null element modulo the modulo element and a shifted parameter. An example of the intermediate shuffled location expression may be:

$$opt\_pos = PRF(k, inp[i]) \% \, M-S.$$

In the intermediate shuffled location expression, opt_pos may represent the intermediate shuffled location, PRF( ) may represent the PRF expression. The parameter k may represent the PRF key. The parameter inp[i] may represent the first non-null element. The parameter S represents the shifted parameter. As above, the "first" does not indicate that the first non-null element is located in a first location or comes before another non-null element. The operator % represents a modulo operator. The parameter M may represent the module element. The modulo element may include an array size of the array or the hash table. In some embodiments, the modulo element may be the array size and/or the shifted parameter may be a product of an initial-arbitrary location of the first non-null element, a number of available cache lines, and a number of objects that fit into one of the number of available cache lines.

At block 1410, it may be determined whether a location in an output array is null. For instance, when the method 1400 proceeds from block 1408 to block 1410, it may be determined whether the location in the output array corresponding to the intermediate shuffled location is null. Alternatively, when the method 1400 proceeds from block 1414 to block 1410, it may be determined whether the a location in the output array corresponding to the updated intermediate shuffled location is null. Responsive to the location in the output array being null ("YES" at block 1410), the method 1400 may proceed to block 1412. Alternatively, responsive to the location in the output array being non-null ("NO" at block 1410), the method 1400 may proceed to block 1414.

At block 1412, a shuffled location may be output. The shuffled location may be set to the intermediate shuffled location or the updated intermediate shuffled location. For instance, when the method 1400 proceeds from block 1408, to block 1410, and to block 1412, the shuffled location may be set to the intermediate shuffled location. Alternatively, when the method 1400 proceeds from block 1414, to block 1410, and to block 1412, the shuffled location may be set to the updated intermediate shuffled location. The shuffled location may include a new location of the first non-null element in the output array for the first non-null element as the intermediate shuffled location.

At block 1414, an updated intermediate shuffled location may be generated. The updated intermediate shuffled location may be generated accordingly to an updated intermediate shuffled location expression described elsewhere in the present disclose. From block 1414, the method 1400 may proceed to blocks 1410 and 1414 until the shuffle location is output at block 1412.

The methods 1100, 1200, 1300, and 1400 may be performed in an environment such as the environment 1000 of FIG. 10 or in the process 100 of FIG. 1. The methods 1100, 1200, 1300, and 1400 may be programmably performed in some embodiments by the shuffle module 123 or the computing system 1500 or some combination thereof. In some embodiments, a computing system (e.g., the computing system 1500) including the shuffle module 123 may include or may be communicatively coupled to a non-transitory computer-readable medium (e.g., the memory 1512 of FIG. 15) having stored thereon programming code or instructions that are executable by one or more processors (such as the processor 1510 of FIG. 15) to cause a computing system to perform or control performance of the methods 1100, 1200, 1300, and 1400. Additionally or alternatively, a computing system (e.g., the computing system 1500) including the shuffle module 123 may include the processor 1510 described elsewhere in this disclosure that is configured to execute computer instructions to cause the computing system to perform or control performance of the methods 1100, 1200, 1300, and 1400.

Figure 15:
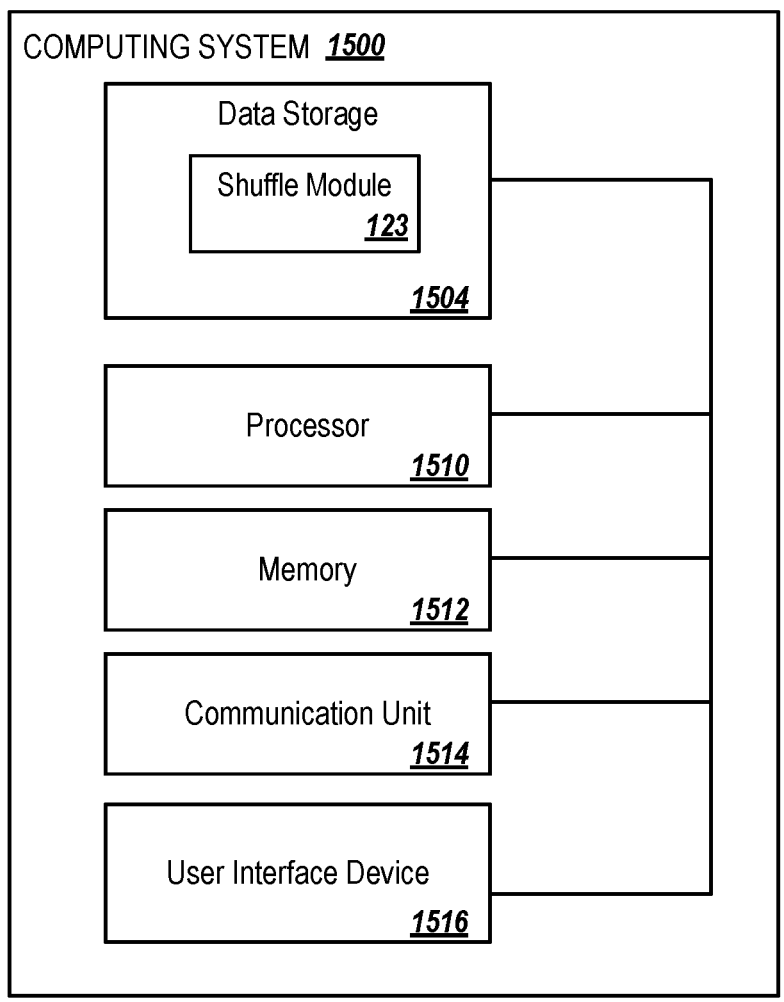
FIG. 15 illustrates an example computing system configured for oblivious array shuffling, all according to at least one embodiments of the present disclosure.

FIG. 15 illustrates an example computing system 1500 configured for oblivious shuffle of an array according to at least one embodiment of the present disclosure. The computing system 1500 may be implemented in the secure hash environment 1000 of FIG. 10 or another suitable environment for instance. Examples of the computing system 1500 may include one or both of the server device 1002 and the client device 1012 of FIG. 10. The computing system 1500 may include one or more processors 1510, a memory 1512, a communication unit 1514, a user interface device 1516, and a data storage 1504 that includes the shuffle module 123.

The processor 1510 may include any suitable special-purpose or general-purpose computer, computing entity, or processing device including various computer hardware or software modules and may be configured to execute instructions stored on any applicable computer-readable storage media. For example, the processor 1510 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 15, the processor 1510 may more generally include any number of processors configured to perform individually or collectively any number of operations described in the present disclosure. Additionally, one or more of the processors 1510 may be present on one or more different electronic devices or computing systems. In some embodiments, the processor 1510 may interpret and/or execute program instructions and/or process data stored in the memory 1512, the data storage 1504, or the memory 1512 and the data storage 1504. In some embodiments, the processor 1510 may fetch program instructions from the data storage 1504 and load the program instructions in the memory 1512. After the program instructions are loaded into the memory 1512, the processor 1510 may execute the program instructions.

The memory 1512 and the data storage 1504 may include computer-readable storage media for carrying or having computer-executable instructions or data structures stored thereon. Such computer-readable storage media may include any available media that may be accessed by a general-purpose or special-purpose computer, such as the processor 1510. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 1510 to perform a certain operation or group of operations.

The communication unit 1514 may include one or more pieces of hardware configured to receive and send communications. In some embodiments, the communication unit 1514 may include one or more of an antenna, a wired port, and modulation/demodulation hardware, among other communication hardware devices. In particular, the communication unit 1514 may be configured to receive a communication from outside the computing system 1500 and to present the communication to the processor 1510 or to send a communication from the processor 1510 to another device or network (e.g., the network 1024 of FIG. 10).

The user interface device 1516 may include one or more pieces of hardware configured to receive input from and/or provide output to a user. In some embodiments, the user interface device 1516 may include one or more of a speaker, a microphone, a display, a keyboard, a touch screen, or a holographic projection, among other hardware devices.

The shuffle module 123 may include program instructions stored in the data storage 1504. The processor 1510 may be configured to load the shuffle module 123 into the memory 1512 and execute the shuffle module 123. Alternatively, the processor 1510 may execute the shuffle module 123 line-by-line from the data storage 1504 without loading them into the memory 1512. When executing the shuffle module 123, the processor 1510 may be configured to perform a secure hash or hash table process as described elsewhere in this disclosure.

Modifications, additions, or omissions may be made to the computing system 1500 without departing from the scope of the present disclosure. For example, in some embodiments, the computing system 1500 may not include the user interface device 1516. In some embodiments, the different components of the computing system 1500 may be physically separate and may be communicatively coupled via any suitable mechanism. For example, the data storage 1504 may be part of a storage device that is separate from a server, which includes the processor 1510, the memory 1512, and the communication unit 1514, that is communicatively coupled to the storage device. The embodiments described herein may include the use of a special-purpose or general-purpose computer including various computer hardware or software modules, as discussed in greater detail below.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. In these and other embodiments, the term "non-transitory" as explained herein should be construed to exclude only those types of transitory media that were found to fall outside the scope of patentable subject matter in the Federal Circuit decision of *In re Nuijten*, 500 F.3d 1346 (Fed. Cir. 2007). Combinations of the above may also be included within the scope of computer-readable media.

Computer-executable instructions comprise, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads).

While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of approximate address shuffling of an array, the method comprising:
   receiving an array having an array size and two or more non-null elements located in initial-arbitrary locations in the array;
   receiving a pseudo-random function (PRF) key;
   initializing an output array to null;
   shuffling at least a portion of the non-null elements to generate shuffled locations for the non-null elements, the shuffling of a first non-null element of the non-null elements including:
      determining an intermediate shuffled location for the first non-null element as an application of a PRF to the PRF key and the first non-null element modulo a modulo element;
      responsive to a location in the output array corresponding to the intermediate shuffled location being null, outputting a shuffled location in the output array for the first non-null element as the intermediate shuffled location;
      responsive to the location in the output array corresponding to the intermediate shuffled location not being null, generating an updated intermediate shuffled location to a sum of the intermediate shuffled location and one modulo the array size; and
      responsive to a location in the output array corresponding to the updated intermediate shuffled location being null, outputting the shuffled location in the output array for the first non-null element as the updated intermediate shuffled location; and
   returning the output array having the first non-null element in the location in the output array that corresponds to the shuffled location.

2. The method of claim 1, further comprising:
   determining whether a number of the non-null elements are above a particular threshold;
   in response to the number of the non-null elements being above the particular threshold:
      choosing a random PRF key; and
      sorting, using a memory-oblivious sort, the non-null elements based on application of the PRF to the random PRF key and the non-null elements.

3. The method of claim 2, wherein the determining the intermediate shuffled location for the first non-null element further includes a difference between the application of the PRF to the PRF key and the first non-null element modulo the modulo element and a shifted parameter.

4. The method of claim 3, wherein the sorting includes sorting according to an odd-even merge sort.

5. The method of claim 4, further comprising:
   dividing the output array into multiple buckets, each of the multiple buckets having a bucket size that is less than a cache size of a trusted execution environment that stores the output array;
   relocating the non-null elements of the received array from the initial-arbitrary locations to first locations in the received array;
   filling a first bucket of the multiple buckets with a first subset of the non-null elements, the first subset including the non-null elements having a first aggregate size that is less than the bucket size; and
   filling a second bucket of the multiple buckets with a second subset of the non-null elements, the second subset including the non-null elements having a second aggregate size that is less than the bucket size,
   wherein the shuffling the at least a portion of the non-null elements includes shuffling the first subset in the first bucket independently of the second subset in the second bucket.

6. The method of claim 5, wherein:
   the filling of the first bucket is performed using a Boolean overflow expression; and
   the filling of the first bucket is performed according to the expressions:

```
For i in range (n/(m*s))
    count = 0;
    For j in range (t)
        overflow = overflow [j]
        out_msi = out [m*s*i]
        inp_j = inp [j]
        opt_pos = PRF (k, inp_j) % n
        if (count < m*s):
            out [m*s*i + count] = inp_j
            if (overflow == true)
                count = count + 1
            else
                if (opt_pos >= m*s*i && opt_pos < m*s*(i+1))
                    count = count + 1
                overflow[j] = false
        else
            out [m*s*i] = out_mki
            if (opt_pos >=m*s*i && opt_pos < m*s*(i+1))
                overflow[j] = true
```

-continued

```
  else
     overflow [j] = overflow, in which:
  i represents an indexing variable that represents the bucket;
  n represents the array size;
  m represents a number of available cache lines;
  s represents a number of objects that fit into one of the number of
available cache lines;
  count represents a counting index variable;
  j represents an indexing variable;
  out[ ] represents an element in the output array;
  out_pos represents an intermediate output value;
  out_msi represents another intermediate output value;
  inp_j represents an intermediate input value;
  && operator represents a conditional AND operator;
  k represents the PRF key;
  inp[ ] represents a particular element of the received array;
  % operator represents a modulo operator;
  * operator represents a multiplication operator;
  == operator represents a equality inquiry operator;
  >= operator represents a greater than or equal to operator; and
  PRF (k, inp_j) represents a pseudo-random function that receives
as input the PRF key and the intermediate input value.
```

7. The method of claim 5, wherein:
the modulo element includes the array size; and
the shifted parameter is equal to a product of the initial-arbitrary location of the first non-null element, a number of available cache lines, and a number of objects that fit into one of the number of available cache lines.

8. The method of claim 1, further comprising:
relocating the non-null elements of the received array from the initial-arbitrary locations to first locations in the received array; and
sorting, using a cache agnostic memory oblivious sort, the non-null elements based on application of the PRF to the PRF key and the non-null elements.

9. The method of claim 1, wherein:
the received array includes a hash table in a trusted execution environment; and
the output array includes the hash table with the shuffled locations.

10. The method of claim 9, wherein the trusted execution environment includes software guard extensions (SGX).

11. A non-transitory computer-readable medium having encoded therein programming code executable by one or more processors to perform or control performance of operations comprising:
receiving an array having an array size and two or more non-null elements located in initial-arbitrary locations in the array;
receiving a pseudo-random function (PRF) key;
initializing an output array to null;
shuffling at least a portion of the non-null elements to generate shuffled locations for the non-null elements, the shuffling of a first non-null element of the non-null elements including:
determining an intermediate shuffled location for the first non-null element as an application of a PRF to the PRF key and the first non-null element modulo a modulo element;
responsive to a location in the output array corresponding to the intermediate shuffled location being null, outputting a shuffled location in the output array for the first non-null element as the intermediate shuffled location;
responsive to the location in the output array corresponding to the intermediate shuffled location not being null, generating an updated intermediate shuffled location to a sum of the intermediate shuffled location and one modulo the array size; and
responsive to a location in the output array corresponding to the updated intermediate shuffled location being null, outputting the shuffled location in the output array for the first non-null element as the updated intermediate shuffled location; and
returning the output array having the first non-null element in the location in the output array that corresponds to the shuffled location.

12. The non-transitory computer-readable medium of claim 11, wherein the operations further comprise:
determining whether a number of the non-null elements are above a particular threshold;
in response to the number of the non-null elements being above the particular threshold:
choosing a random PRF key; and
sorting, using a memory-oblivious sort, the non-null elements based on application of the PRF to the random PRF key and the non-null elements.

13. The non-transitory computer-readable medium of claim 12, wherein the determining the intermediate shuffled location for the first non-null element further includes a difference between the application of the PRF to the PRF key and the first non-null element modulo the modulo element and a shifted parameter.

14. The non-transitory computer-readable medium of claim 13, wherein the sorting includes sorting according to an odd-even merge sort.

15. The non-transitory computer-readable medium of claim 14, wherein the operations further comprise:
dividing the output array into multiple buckets, each of the multiple buckets having a bucket size that is less than a cache size of a trusted execution environment that stores the output array;
relocating the non-null elements of the received array from the initial-arbitrary locations to first locations in the received array;
filling a first bucket of the multiple buckets with a first subset of the non-null elements, the first subset including the non-null elements having a first aggregate size that is less than the bucket size; and
filling a second bucket of the multiple buckets with a second subset of the non-null elements, the second subset including the non-null elements having a second aggregate size that is less than the bucket size,
wherein the shuffling the at least a portion of the non-null elements includes shuffling the first subset in the first bucket independently of the second subset in the second bucket.

16. The non-transitory computer-readable medium of claim 15, wherein:
the filling of the first bucket is performed using a Boolean overflow expression; and
the filling of the first bucket is performed according to the expressions:

```
For i in range (n/(m*s))
  count = 0;
  For j in range (t)
    overflow = overflow [j]
    out_msi = out [m*s*i]
    inp_j = inp [j]
    opt_pos = PRF (k, inp_j) % n
    if (count < m*s):
       out [m*s*i + count] = inp_j
       if (overflow == true)
          count = count + 1
```

-continued

```
    else
        if (opt_pos >= m*s*i && opt_pos < m*s*(i+1))
            count = count + 1
    overflow[j] = false
    else
        out [m*s*i] = out_mki
        if (opt_pos >=m*s*i && opt_pos < m*s*(i+1))
            overflow[j] = true
        else
            overflow [j] = overflow, in which:
i represents an indexing variable that represents the bucket;
n represents the array size;
m represents a number of available cache lines;
s represents a number of objects that fit into one of the number of
available cache lines;
count represents a counting index variable;
j represents an indexing variable;
out[ ] represents an element in the output array;
out_pos represents an intermediate output value;
out_msi represents another intermediate output value;
inp_j represents an intermediate input value;
&& operator represents a conditional AND operator;
k represents the PRF key;
inp[ ] represents a particular element of the received array;
% operator represents a modulo operator;
* operator represents a multiplication operator;
== operator represents a equality inquiry operator;
>= operator represents a greater than or equal to operator; and
PRF (k, inp_j) represents a pseudo-random function that receives as
input the PRF key and the intermediate input value.
```

17. The non-transitory computer-readable medium of claim 15, wherein:

the modulo element includes the array size; and the shifted parameter is equal to a product of the initial-arbitrary location of the first non-null element, a number of available cache lines, and a number of objects that fit into one of the number of available cache lines.

18. The non-transitory computer-readable medium of claim 11, wherein the operations further comprise:

relocating the non-null elements of the received array from the initial-arbitrary locations to first locations in the received array; and sorting, using a cache agnostic memory oblivious sort, the non-null elements based on application of the PRF to the PRF key and the non-null elements.

19. The non-transitory computer-readable medium of claim 11, wherein:

the received array includes a hash table in a trusted execution environment; and the output array includes the hash table with the shuffled locations.

20. The non-transitory computer-readable medium of claim 19, wherein the trusted execution environment includes software guard extensions (SGX).

* * * * *